(12) United States Patent
Takada

(10) Patent No.: US 10,911,240 B2
(45) Date of Patent: Feb. 2, 2021

(54) OFF-CHAIN BLOCKCHAIN STORAGE WITH VALIDATION

(71) Applicant: HITACHI, LTD., Tokyo (JP)

(72) Inventor: Aritoki Takada, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 296 days.

(21) Appl. No.: 16/041,877

(22) Filed: Jul. 23, 2018

(65) Prior Publication Data

US 2020/0028688 A1    Jan. 23, 2020

(51) Int. Cl.
*H04L 9/32*    (2006.01)

(52) U.S. Cl.
CPC .......... *H04L 9/3239* (2013.01); *H04L 9/3247* (2013.01); *H04L 2209/38* (2013.01)

(58) Field of Classification Search
CPC .. H04L 9/3239; H04L 9/3247; H04L 2209/38
See application file for complete search history.

(56) References Cited

U.S. PATENT DOCUMENTS

| | | | |
|---|---|---|---|
| 2019/0180276 A1* | 6/2019 | Lee | G06Q 20/0655 |
| 2019/0182257 A1* | 6/2019 | Lee | H04L 63/102 |
| 2019/0238525 A1* | 8/2019 | Padmanabhan | H04L 9/3236 |
| 2019/0327080 A1* | 10/2019 | Liu | H04L 9/3247 |
| 2019/0354693 A1* | 11/2019 | Yoon | G06F 21/6245 |
| 2019/0356470 A1* | 11/2019 | Deshpande | H04L 9/0637 |
| 2019/0356471 A1* | 11/2019 | Vaughn | G06F 21/602 |
| 2019/0356674 A1* | 11/2019 | Irazabal | H04L 63/105 |
| 2019/0362361 A1* | 11/2019 | Irazabal | H04L 63/0428 |
| 2019/0378418 A1* | 12/2019 | Menadue | G08G 1/22 |
| 2019/0384627 A1* | 12/2019 | De Caro | G06Q 20/3827 |
| 2020/0005559 A1* | 1/2020 | Grunbok, II | H04L 9/3242 |
| 2020/0007312 A1* | 1/2020 | Vouk | H04L 67/104 |
| 2020/0007313 A1* | 1/2020 | Vouk | H04L 9/3239 |

(Continued)

FOREIGN PATENT DOCUMENTS

| | | |
|---|---|---|
| JP | 2016-218633 A | 12/2016 |
| JP | 2017-224017 A | 12/2017 |

OTHER PUBLICATIONS

Japanese Office Action received in corresponding Japanese Application No. 2019-045796 dated Mar. 3, 2020.

*Primary Examiner* — Joseph P Hirl
*Assistant Examiner* — Stephen T Gundry
(74) *Attorney, Agent, or Firm* — Mattingly & Malur, PC

(57) ABSTRACT

In some examples, a first computing device associated with a first blockchain node receives a transaction request along with related data for storage in an off-chain storage. The first blockchain node may send a communication to a second blockchain node to propose recording the transaction on the blockchain, which may result in the transaction being recorded in a new block on the blockchain as conditionally accepted pending validation of the related data. The first computing device may send the related data to a second computing device associated with the second blockchain node that performs validation. The first blockchain node receives, from the second blockchain node, a communication that proposes recording of the transaction on the blockchain as being validated. The first and second blockchain nodes may send one or more communications to cause addition of another new block to the blockchain indicating validity of the transaction.

20 Claims, 35 Drawing Sheets

(56) References Cited

U.S. PATENT DOCUMENTS

| | | | |
|---|---|---|---|
| 2020/0007314 A1* | 1/2020 | Vouk | H04L 63/102 |
| 2020/0007315 A1* | 1/2020 | Vouk | H04L 9/0637 |
| 2020/0007581 A1* | 1/2020 | Vouk | H04L 9/3239 |
| 2020/0019616 A1* | 1/2020 | Sukhija | G06F 16/2365 |
| 2020/0019706 A1* | 1/2020 | Zhu | H04L 9/0637 |
| 2020/0021598 A1* | 1/2020 | Lee | H04L 63/102 |
| 2020/0026785 A1* | 1/2020 | Patangia | H04L 63/00 |
| 2020/0027085 A1* | 1/2020 | Lee | G06Q 20/401 |
| 2020/0169546 A1* | 5/2020 | Padmanabhan | H04L 63/101 |

* cited by examiner

US 10,911,240 B2

OFF-CHAIN BLOCKCHAIN STORAGE WITH VALIDATION

BACKGROUND

A blockchain is a type of distributed data structure that maintains a continuously growing series (i.e., a chain) of records called blocks. Each block contains a timestamp and a link to a previous block. The blocks may store transactions or other types of information. The verification process for a block may be performed fairly simply, which reduces the possibility of fraudulent transactions. By storing data distributed in multiple locations across a network, the blockchain reduces or eliminates the risks that come with data being held centrally.

Blockchain technology is not considered suitable for storing large-sized data on the blockchain. For example, the block size may be limited so that each block of the blockchain may store only a specified amount of data up to some maximum limit. The block size limit can facilitate communication of the blocks among a plurality of consensus nodes that make up the blockchain network. In some cases large files may be divided into smaller files for storage across multiple blocks in the blockchain. In other cases, large files or other large-sized data may be stored separately from the blockchain (i.e., "off-chain"), and a hash of the data may be stored on the blockchain to maintain a record of the data on the blockchain.

SUMMARY

Some examples herein include a first computing device associated with a first blockchain node that receives a transaction request along with related data, where the related data is to be stored in an off-chain storage. The first blockchain node may send a communication to a second blockchain node to propose recording the transaction on the blockchain, which may result in the transaction being recorded in a new block on the blockchain as conditionally accepted pending validation of the related data. The first computing device may send the related data to a second computing device associated with the second blockchain node that performs validation. The first blockchain node receives, from the second blockchain node, a communication that proposes recording of the transaction on the blockchain as being validated. The first and second blockchain nodes may send one or more communications to cause addition of another new block to the blockchain indicating validity of the transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
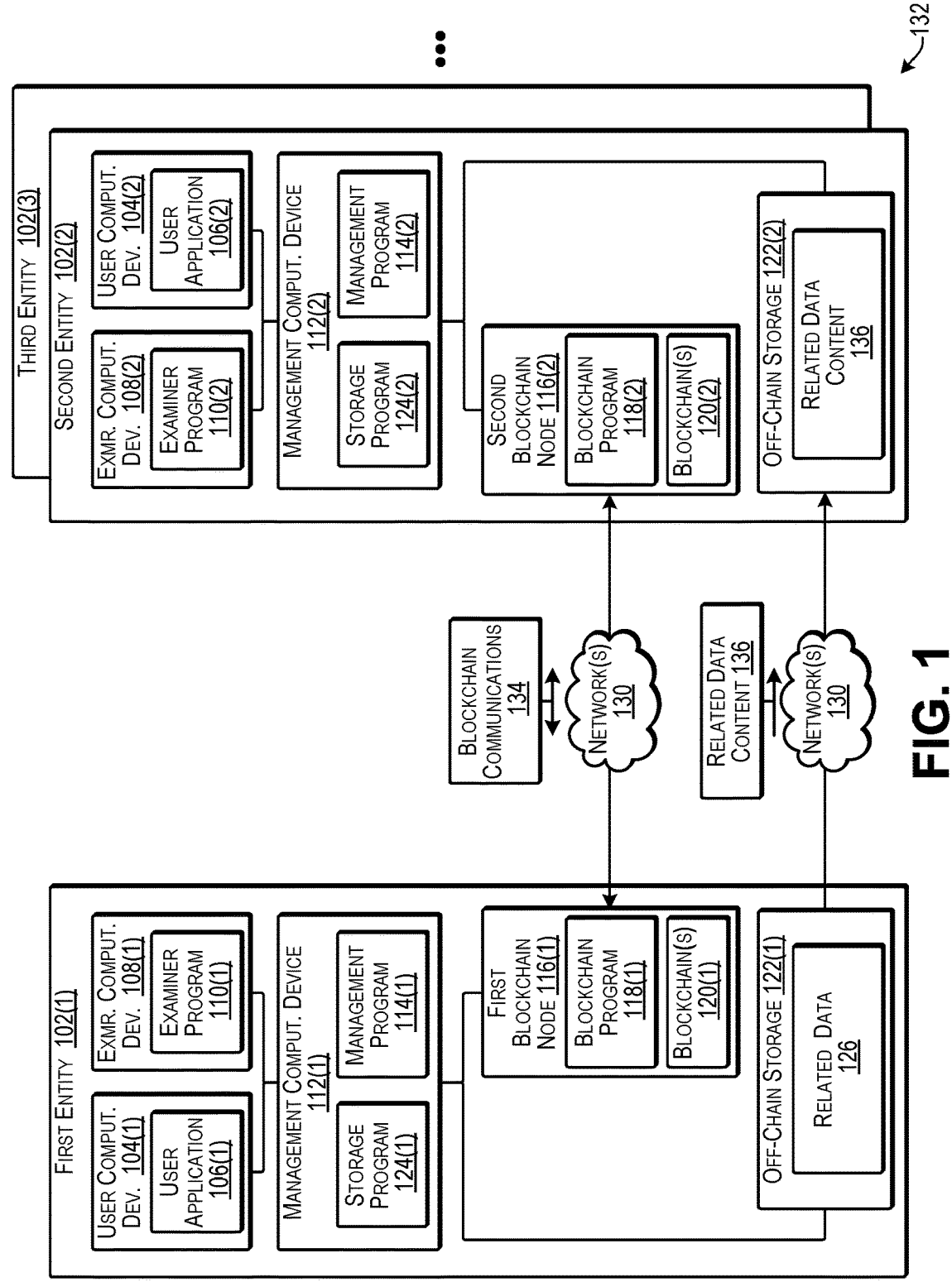
FIG. 1 illustrates an example architecture of a system for blockchain logging of data according to some implementations.

Some implementations herein are directed to techniques and arrangements for enabling verification and documenting of data stored off-chain in connection with a block of a blockchain. For example, the data stored off-chain may be related data that is related to information stored in one or more blocks of a blockchain, but the entire related data itself is not stored in the one or more blocks on the blockchain. In a first example, the related data stored off-chain may be sent to one or more other entities for validation along with a proposal for recording information about a transaction on the blockchain. In this example, the validation of the related data and the addition of a new block to the blockchain to document the transaction may be performed synchronously, i.e., the related data stored off-chain and the transaction information may be validated before the new block is added to the blockchain.

In other examples, the related data stored off-chain may be transferred asynchronously with respect to recording the information about the transaction on the blockchain. For instance, information about the transaction and the related data may be sent to one or more other entities participating in the blockchain network, and an intermediate or otherwise conditional recordation of the transaction information and information about the related data may be stored on the blockchain. Subsequently, the related data associated with the transaction may be sent to the one or more other entities, and subject to examination to verify the related data and the transaction. If the transaction and the related data stored off-chain pass the validation examination, the conditional state of the transaction may be changed to an approved state or otherwise agreed-to state, and recorded in a new block on the blockchain.

As one example of a synchronous validation implementation, a first computing device associated with a first blockchain node may receive a transaction request and associated related data that is over a threshold size for storage on the blockchain. In some cases, the first computing device may compare a size of the received related data to a threshold maximum size of data allowed on the blockchain to determine that the related data should be stored in an off-chain storage location. In response to receiving the related data and determining that the size of the related data exceeds the threshold size, the first computing device may store the related data in the off-chain storage location. Furthermore, the first blockchain node may send a communication to one or more respective second blockchain nodes in the blockchain network to propose recording the transaction on the blockchain. For example, the communication may include information about the transaction and a hash value or other summary value representative of the content of the related data, as well as a digital signature of the first entity. In addition, the first computing device may send the related data, e.g., at least the content of the related data, to one or more respective second computing devices associated with the one or more respective second blockchain nodes.

Following receipt of the related data and the information about the transaction, at least one of the respective second computing devices may perform validation of the received related data based on comparison with the received hash value. The at least one second computing device may instruct a corresponding second blockchain node to endorse recordation of the transaction on the blockchain if the transaction information and the related data pass the validation examination. Accordingly, based on a result of the validation passing the examination, the first blockchain node may receive, from at least one of the respective second blockchain nodes, a communication that endorses recording of the transaction on the blockchain. For example, the communication may include a digital signature of the entity requesting the endorsement. Based at least in part on the at least one communication with the endorsement, the first blockchain node may send, to the respective second blockchain nodes, the transaction information including the hash value and the at least one endorsement to cause addition of a new block to the blockchain.

Similarly, in the asynchronous example, a first computing device associated with a first blockchain node may receive a transaction request and associated related data that is over a threshold size for storage on the blockchain. In some cases, the first computing device may compare a size of the received related data to a threshold maximum size of data allowed on the blockchain to determine that the related data should be stored off-chain. In response to receiving the related data and determining that the size of the related data exceeds the threshold size, the first computing device may store the related data in an off-chain storage location. Additionally, the first blockchain node may send a communication to one or more respective second blockchain nodes in the blockchain network to propose recording the transaction on the blockchain. In addition, the communication may include a hash value or other summary value representative of the content of the related data, as well as a digital signature of the first entity.

The second blockchain nodes may receive the communication proposing recordation of the transaction and may send back an endorsement, e.g., after verifying a digital signature of the source of communication. Accordingly, the first blockchain node may receive, from at least one of the respective second blockchain nodes, a communication that endorses recording of the transaction on the blockchain nodes as conditionally accepted pending verification of the related data and the transaction information. Based at least in part on receiving the at least one communication with the endorsement, the first computing device may send, to the respective second blockchain nodes, the transaction information including the hash value of the related data and the at least one endorsement to cause addition of a new block to the blockchain. Accordingly, the transaction information and the hash value of the related data may be recorded on the blockchain, rendering the information immutable, even though the related data and the transaction information have not yet been verified.

Subsequently, the first computing device may send the related data to one or more respective second computing devices associated with the one or more respective blockchain nodes. At least one of the respective second computing devices may perform validation of the received related data and the transaction information based on comparison with the received hash value and other examination procedures. The at least one second computing device may instruct a corresponding second blockchain node to endorse recordation of the transaction on the blockchain if the transaction information and the related data pass the validation examination. Accordingly, based on a result of the validation having passed the examination, the first blockchain node may receive, from at least one of the respective second blockchain nodes, a communication that proposes recording of the transaction on the blockchain as being validated, the communication including a digital signature. In response, the first blockchain node may send, to at least one of the respective second blockchain nodes, a communication that endorses recording of the transaction as validated on the blockchain. As a result, the first blockchain node may receive, from the respective second blockchain nodes, the transaction information including the hash value and the at least one endorsement to cause addition of a new block to the blockchain.

Some examples herein apply in the environment of blockchain systems that include a plurality of blockchain node computing devices (hereinafter "blockchain nodes"). The blockchain nodes may be configured to add, to the blockchain, the transaction data as new blocks added to respective instances of a blockchain managed by each respective blockchain node. In addition, data related to the transactions that exceeds a size specified for storing in the blocks of the blockchain may be stored as related data in an off-chain storage location, and may be verified, along with the transaction data using the techniques described herein.

For discussion purposes, some example implementations are described in the environment of off-chain data storage and verification for blockchains used in connection with an agreement or other type of transaction. However, implementations herein are not limited to the particular examples provided, and may be extended to other blockchain applications, other types of transactions, other types of related data, other types of computing systems, other system architectures, and so forth, as will be apparent to those of skill in the art in light of the disclosure herein.

FIG. 1 illustrates an example architecture of a system 100 for off-chain storage of content associated with a blockchain according to some implementations. In this example, a first entity 102(1) includes one or more computing devices, such as a user computing device 104(1) including a user application 106(1); an examiner computing device 108(1) including an examiner program 110(1); a management computing device 112(1) including a management program 114(1); and a first blockchain node computing device ("blockchain node") 116(1) including a blockchain program 118(1) having one or more associated blockchains 120(1). In addition, the first entity 102(1) may include off-chain storage 122(1). In this example, the management computing device 112(1) may include a storage program 124(1) that manages storing related data 126(1) in the off-chain storage 122(1). In some examples, the storage program 124(1) may be included as a module of the management program 114(1). In other examples, the storage program 124(1) may be separate from the management program 114(1), or may execute on a separate storage computing device (not shown in FIG. 1).

In some configurations, each of the computing devices 104(1), 108(1), 112(1), and 116(1) may be the same computing device or, alternatively, may be separate computing devices, or any other possible combination thereof. As one example, the blockchain node 116(1) may be a physically separate computing device from the user computing device 104(1), the examiner computing device 108(1), and the management computing device 112(1). Further, in some cases, the user computing device 104(1) may be separate from the examiner computing device 108(1), and the management computing device 112(1). Additionally, in some cases, the off-chain storage 122(1) may be associated with a storage system, such as a storage array, RAID storage, storage area network, network attached storage, cloud storage, or the like, and may include a storage controller (not shown in FIG. 1). As still another example, some or all of the computing devices 104(1), 108(1), 112(1), and 116(1) may be instantiated as one or more virtual machines. Numerous other variations will be apparent to those of skill in the art having the benefit of the disclosure herein. Additional details of the computing devices 104(1), 108(1), 112(1), and 116(1) and their various functions are discussed below e.g., with respect to FIG. 35.

The computing devices 104(1), 108(1), 112(1), and 116(1) of the first entity 102(1) may communicate with each other and with respective computing devices of one or more other entities over one or more networks 130. In the illustrated example, one or more of the computing devices of the associated with the first entity 102(1) are able to communicate with computing devices of a second entity 102(2), a third entity 102(3), and so forth. For instance, the second entity 102(2) and the third entity 102(3) may have one or more of the same computing devices and/or functional components as the first entity 102(1).

Accordingly, in this example, the second entity 102 is associated with a user computing device 104(2) including a user application 106(2); an examiner computing device 108(2) including an examiner program 110(2); a management computing device 112(2) including a management program 114(2) and a storage program 124(2); a second blockchain node computing device ("blockchain node") 116(2) including a blockchain program 118(2) having one or more associated blockchains 120(2); and off-chain storage 122(2) for storing at least related data content 136 of the related data 126. The third entity 102(1) may include similar or different functional components capable of performing some or all of the operations described herein with respect to the first entity 102(1) and the second entity 102(2), but these are not shown in FIG. 1 for clarity of illustration.

The one or more networks 130 may include any suitable communication technology, including a wide area network, such as the Internet; a local area network, such as an intranet; a wireless network, such as a cellular network; a local wireless network, such as Wi-Fi; short-range wireless communications, such as BLUETOOTH®; a wired network including Fibre Channel, fiber optics, Ethernet, or any other such network, a direct wired connection, or any combination thereof. Thus, the network(s) 130 may include wired and/or wireless communication technologies. The protocols used to communicate over such networks are well known in the art and will not be discussed in detail in this disclosure.

The blockchain programs 118(1) and 118(2) on the respective blockchain nodes 116(1) and 116(2) may be configured to manage respective blockchains 120(1) and 120(2), which may be separately maintained versions of the same blockchain in this example. For instance, the blockchain program 118(1) may maintain and add to the blockchain 120(1) and the blockchain program 118(2) may maintain and add to the blockchain 120(2). Accordingly, the blockchain nodes 116(1) and 116(2) may be blockchain nodes that participate in a blockchain network 132 that includes a plurality of the blockchain nodes 116.

In some examples, the blockchain network 132 provided by the system 100 may be a scalable, decentralized peer-to-peer system able to generate and maintain the blockchain 120 or other blockchains (not shown in FIG. 1). The integrity of the data maintained in the blockchain 120 may be based on a consensus mechanism rather than, e.g., a mere trust-based infrastructure. In examples herein, "consensus" may refer to a collective decision-making process or agreement as to what is true or false. For instance, blockchain network 132 in the system 100 provides a distributed consensus network made up of the participating block chain nodes 116, which may serve as consensus nodes. The various different consensus nodes participating in the blockchain network 132 in the system 100 may exchange a series of blockchain communications 134 come to a consensus, such as based on a proposal by a one blockchain node 116 and an endorsement of the proposal by one or more other ones of the blockchain nodes 116. In some cases, individual blockchain nodes 116 may contribute their own data to enable the blockchain network 116 as a whole to achieve a collective agreed-upon decision.

The blockchain network 132 in the system 100 is configured to record data as successive blocks in the blockchain 120, which serves as a distributed data structure for the data. As a result, the data is securely and immutably recorded in the blockchain 120 and is practically unalterable. All the blockchain nodes 116 in the system 100 may execute the same blockchain program 118. When a consensus is reached for a particular block, the blockchain nodes 116 may record that block to the blockchain 120. Accordingly, in some cases, each of the blockchain nodes 116 may maintain a complete copy of the blockchain 120.

In some examples, the decentralized peer-to-peer nature of the blockchain network 132 in the system 100 herein may help prevent any single user, group of users, or other entity 102 from controlling the underlying infrastructure or undermining the integrity of the blockchain network 132. For instance, the entities 102 may be individuals, groups, corporations, state actors, organizations, and so forth, or a combination of any these entities. In some examples herein, the system 100 may be private (i.e., not generally accessible to the public) and the blockchain nodes 116 may typically be owned by, operated by, or otherwise associated with one or more of the entities 102. In other cases, some or all of the blockchain nodes 116 may be associated with a third party who provides the blockchain network 132 as a service. Numerous other variations will be apparent to those of skill in the art having the benefit of the disclosure herein.

In the illustrated example, there are three entities illustrated but the number of entities may vary for various different applications. In some examples, the user application 106, the examiner program 110, the management program 114, the storage program 124 and/or the blockchain program 118 may communicate with each other and/or with the programs of the other entities directly and/or through one or more application programming interfaces (APIs). Accordingly, implementations herein are not limited to any protocol or other technique for communication between the various programs. Furthermore, while the programs 106, 110, 114, 118, and 124 are illustrated for convenience of discussion, it will be apparent to those of skill in the art that more or fewer programs may be executed in the examples herein for performing the functionality described herein.

In some cases, the user application 106 may be an application program that may be used by one or more users of an entity 102 for making agreements, conducting transactions, etc., with users of one or more other entities 102 participating in the system 100. Furthermore, the management program 114 may be configured to receive requests for smart contracts, agreements or other types of transactions, and for managing a combination of blockchain recordation of transactions as well as management of off-chain storage of related data 126 that may be related to a particular transaction. In some examples, the storage program 124 may interact with the off-chain storage 122 such as for storing the related data 126 in the off-chain storage 122 and for controlling transfer the related data 126, or at least the content thereof as related data content 136, to other entities 102. In some examples, the storage program 124 may be incorporated into an object storage computing device, a storage area network, a network attached storage, or any other types of storage devices that may be used in the systems described herein.

Furthermore, the examiner program 110 may be executed to perform validation of related data and transaction information for transactions to be recorded on the blockchain 120. As discussed in the examples herein, the examiner program 110 may be invoked by the management program 114 to perform the validation examination of the related data stored at an off-chain storage 122, and the transaction information corresponding to the related data. Furthermore, as mentioned above, in some cases the examiner program 110 may be a module or subcomponent of the management program 114, and may be executed on the management computing device 112, thus eliminating the separate examiner computing device 108.

In some cases, the management computing devices 112 may be used for managing and validating transactions recorded on the blockchain 120, e.g., using the management program 114 for a variety of different applications, such as for executing conditions of a smart contract, performing security transactions, logging events in a system, managing internet of things (IoT) devices, managing data, tracking banking transactions, or any of numerous other applications (referred to generally herein as recording transactions). In some examples herein, a smart contract may create a record on the blockchain 120, which describes an agreement with consensus from stakeholders, such as the first entity 102(1), the second entity 102(2), and the third entity 102(3) in the illustrated example. For instance, the smart contract may be executed to automatically trigger certain operations, such as on other computing devices when a specified condition for performing a transaction is detected.

In some examples herein, the processes may include examination to determine validation of evidence related to a smart contract or an associated transaction. Thus, the system 100 includes the capability to handle digital evidence, i.e., related data that is related to a particular agreement or other transaction to be recorded on the blockchain 120, but that is stored off-chain from the blockchain. A stakeholder of the smart contract may want to examine or validate the related data during the smart contract process, and also may want to make sure the evidence is immutable. However, the data size of the related data is often larger than the threshold size that blockchain blocks are configured to handle. In particular, most blockchain technology limits the data size in individual blocks to a relatively small threshold size, e.g., under 1 MB, 2 MB, etc., so that the communication protocols in the blockchain network and the persistent data format remain efficient.

Implementations herein enable interaction among multiple entities on the blockchain. The agreements or other transactions may be executed and recorded on the blockchain 120 by proposing an agreement document or other transaction document, which is expressed in digital manner, but which refers to or is otherwise associated with some related data as evidence to support the agreement or other transaction. For example, the related data may be provided by at least one of the entities participating in the transaction.

The following examples, use term "agreement" and the terms "proposal", "examination" and "endorsement" when recording the "agreement", but the described techniques may apply to any transaction or other information being recorded on a blockchain that refers to related data stored in an off-chain storage. Accordingly, implementations herein are limited to "agreements" per se. Furthermore, in some examples, herein different entities may perform different types of validation. For example, a first entity may propose an agreement or other transaction to a second entity for recordation on the blockchain. The second entity may perform validation of the transaction information and the related data to ensure that the related data matches a hash and that the transaction does not violate a rule, law, regulation, etc., while the third entity may perform a different validation examination, such as to ensure that the transaction does not violate a rule, law, regulation, etc., of concern to the third entity that may not have been a concern to the second entity, such as in the case that the entities are in different countries or other different jurisdictions. Thus, the endorsement from the second entity may confirm passage of examination by the second entity and endorsement from the third entity may confirm passage of examination by the third entity. In other situations, endorsement by a single entity may be sufficient.

As still another example, the second entity may be a supervisor of the first entity, and the agreement or other transaction information may be a request for confirmation from the second entity, as supervisor, for a business process proposed by the first entity. In this case, the proposal from the first entity to the second entity may be requesting validation that the business process described, such as for proposed interactions with a customer of the first entity. The examination by the second entity may include a confirmation that the proposed business process does not violate any law, regulation, or business practice of the organization to which the first entity and the second entity belong.

Figure 2:
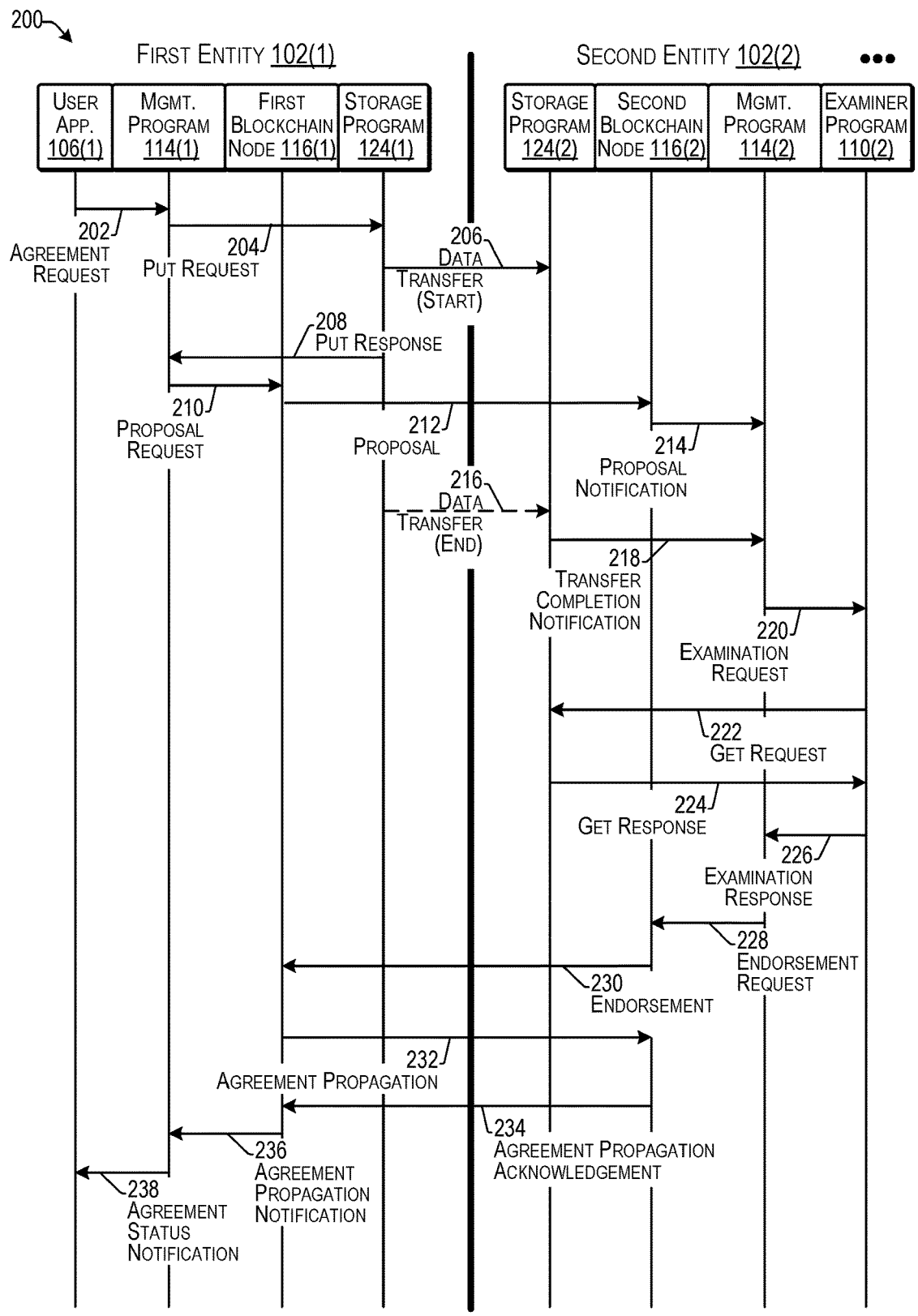
FIG. 2 is a sequence diagram illustrating an example process for synchronous verification of related data stored off-chain according to some implementations.
Figure 3:
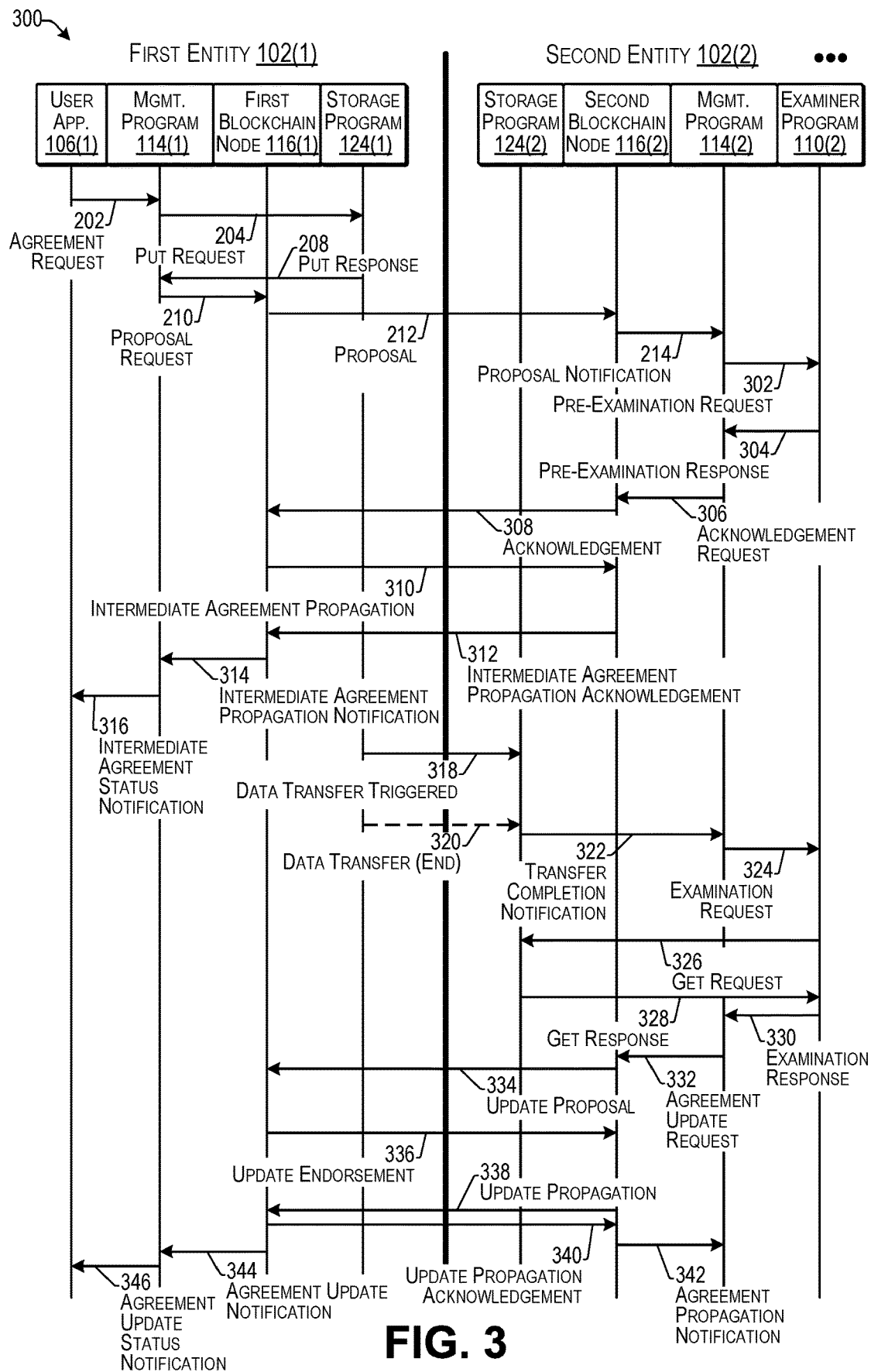
FIG. 3 is a sequence diagram illustrating an example process for asynchronous verification of related data stored off-chain according to some implementations.

FIGS. 2 and 3 are sequence diagrams illustrating example processes and interaction of functional components of the first entity 102(1) and the second entity 102(2) for verification of the related data for a blockchain according to some implementations. FIG. 2 is a sequence diagram illustrating an example process 200 for synchronous verification of the related data according to some implementations. FIG. 3 is a sequence diagram illustrating an example process 300 for asynchronous verification of the related data according to some implementations. For instance, during the example synchronous process 200 of FIG. 2, the related data may be transferred and validated together with a consensus. On the other hand, the example asynchronous process 300 includes obtaining an immutable consensus without transfer or validation of the related data, subsequent data transfer and validation. Thus, the asynchronous process 300 enables an "under validation state" on the blockchain with synchronous immutability and asynchronous validity. The validation result may be added to the blockchain after validation is determined. Thus, the asynchronous process 300 can enable initial immutability and the implementation of complicated validation logic.

In the example of FIG. 2, suppose that the first entity 102(1) proposes to record information (referred to as an agreement in this example) on the blockchain, and that the agreement has related data that will not be stored on the blockchain. For example, the related data may exceed a threshold size for storage in a block of the blockchain or may be otherwise not stored in the blockchain. Further, suppose that at least the second entity 102(2) is participating in the process 200. There may be other entities (e.g., the third entity, etc.,) also participating, but the interaction related to the third entity may be generally the same as with the second entity and therefore is not separately illustrated for clarity purposes.

At 202, the user application 106(1) associated with the first entity 102(1) may issue an agreement request. For example, the user application 106(1) may create an agreement request based on an existing smart contract or other agreement between the first entity 102(1) and one or more other entities 102, such as the second entity 102(2).

Figure 4:
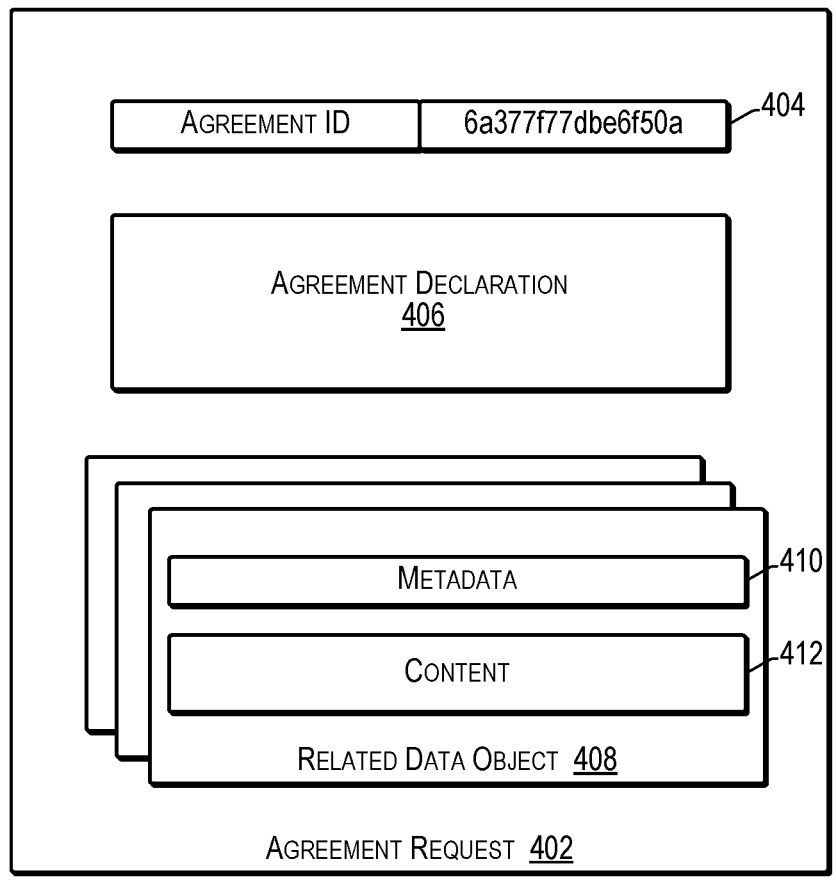
FIG. 4 illustrates an example data structure of an agreement request according to some implementations.

FIG. 4 illustrates an example data structure of an agreement request 402 according to some implementations. In this example, the agreement request 402 includes an agreement identifier (ID) 404, and agreement declaration 406, and one or more related digital data objects 408. Each of the related digital data objects 408 may include a metadata 410 and content 412. Examples of metadata 410 may include a title or other name of the data object, information about the content, a date of creation, a size of the object, owner information, or the like.

The agreement ID 404 may be an ID that is unique, or otherwise individually distinguishable, within the blockchain network and thereby able to identify the corresponding agreement with specificity. The agreement declaration 406 may be a digital or otherwise machine-readable document that describes the corresponding agreement. For example, the agreement declaration 406 may be formatted in plain text, JSON, XML, or any of various other formats, and may describe the agreement between the entities. Furthermore, in some examples, the agreement declaration 406 may include one or more citations to the related data object(s) 408.

Each related data object 408 may be or may include related data to support the agreement. Thus, the related data object(s) 408 may include any type of digital data related to the agreement, such as a photograph or other image, a copy of legal document, audio or video recordings related to the agreement, data structures related to the agreement, and so forth. Each related data object 408 may include the metadata 410, which may include a title, or the like, that indicates the significance of the related data object 408 with respect to the agreement, and the content 412, which is the data itself. The related data objects 408 may be provided directly by the user application or other sources associated with the first entity 102(1). Alternatively, the related data objects 408 may be provided by other entities, such as prior to initiation of the process set forth in FIG. 2.

Returning to FIG. 2, at 204, the management program 114(1) associated with the first entity 102(1) may issue a put request to the storage program 124(1) associated with the first entity 102(1). For example, in response to receiving the agreement request, the management program 114(1) may initiate the put request at 204. The put request may instruct the storage program 124(1) to store at least the content 412 of each related data object 408 to the off-chain storage managed by the storage program 124(1). In some examples, the put request may also request that the storage program 124(1) store at least a portion of the metadata 410 associated with the content 412. A single put request may be employed for storing multiple related data objects 408. Alternatively, a separate put request may be used for each separate related data object 408. Furthermore, the storage program 124(1) may assign an object ID to each piece of content 412 for each related data object 408.

Figure 5:
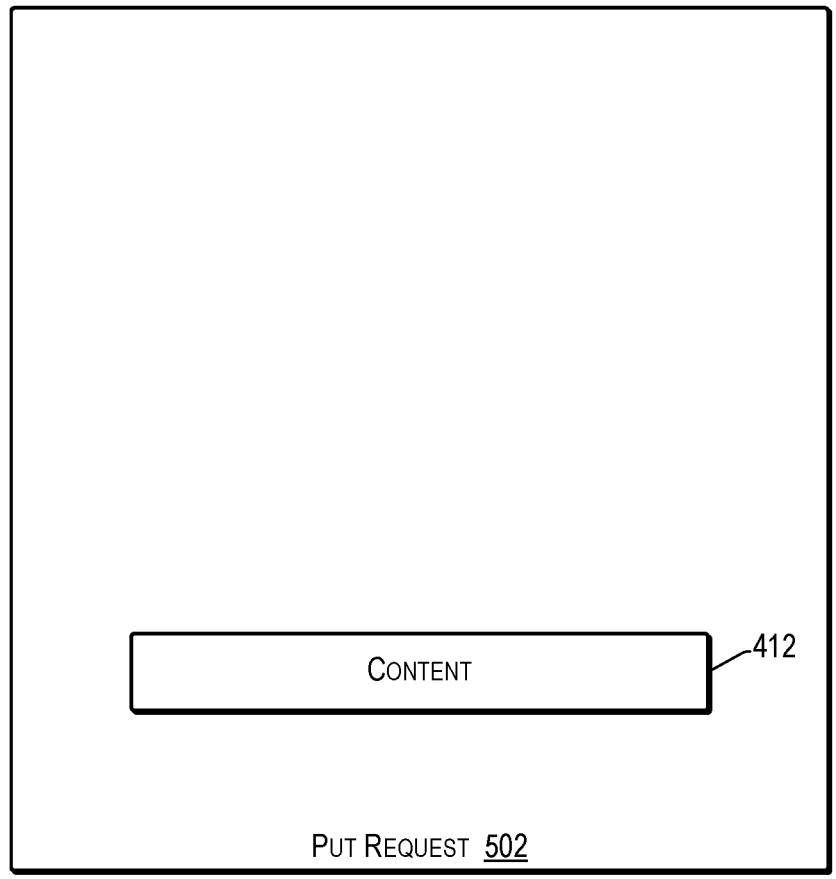
FIG. 5 illustrates an example data structure of a put request according to some implementations.

FIG. 5 illustrates an example data structure of a put request 502 according to some implementations. In this example, the put request 502 includes the content 412 of a related data object 408. As mentioned above, in other examples, the put request 502 may include the content 412 of multiple related data objects 408. Furthermore, in other examples, the put request 502 may also include some or all of the metadata 410 associated with the content 412 for a related data object 408.

Returning to FIG. 2, at 206, the storage program 124(1) associated with the first entity 102(1) may start data transfer to the storage program 124(2) associated with the second entity 102(2) and to any other entities participating in the agreement. For example, following storage of the related data object 408 in response to storing the content 412 included with the put request at 204, the storage program 124(1) may transfer at least the content 412 and the corresponding content ID for each piece of content 412 to the storage program 124(2) associated with the second entity 102(2) and any other entities participating in the agreement (i.e., stakeholders). Furthermore, in some examples, the storage program 124 may also transfer some or all of the metadata 410 associated with the content 412.

At 208, the storage program 124(1) associated with the first entity 102(1) may issue a put response to the management program 114(1). For example, in addition to transferring the data to the other entit(ies), the storage program 124(1) may send the put response to the management program to indicate the object ID associated with each content 412 of each related data object 408. The put response may also include a hash value calculated from the content 412 of the related data object 408 that corresponds to the object ID.

Figure 6:
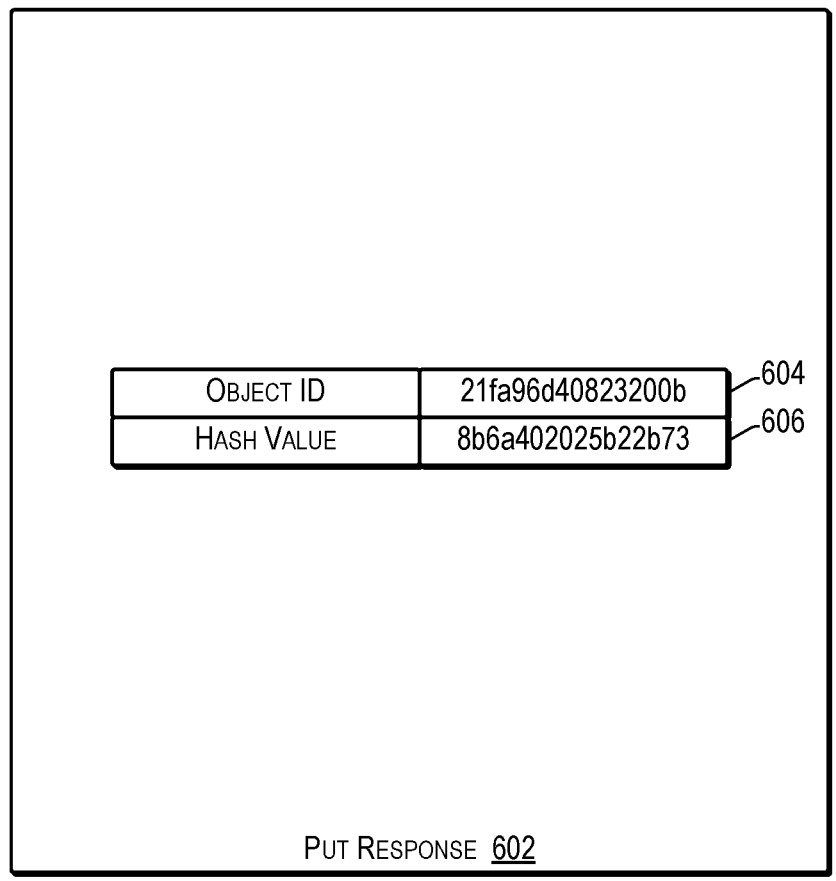
FIG. 6 illustrates an example data structure of a put response according to some implementations.

FIG. 6 illustrates an example data structure of a put response 602 according to some implementations. The put response 602 in this example includes the object ID 604 assigned to or otherwise associated with the object content 412 that was the subject of the put request. In addition, in some cases, the put response 602 may include the hash value calculated for the object content 412. For example, the hash value may be calculated using a suitable hash algorithm, or the like, such as SHA-0, SHA256, SHA512, or any of various other hash algorithms known in the art. Furthermore, while a hash algorithm is described as one technique for providing a short summary value that is representative of the content of the related data object 408, various other techniques, such as digital fingerprinting, or the like, will be apparent to those of skill in the art having the benefit of the disclosure herein. Additionally, in other cases, the hash value 606 might not be included, and the management program 114(1) may calculate the hash value 606 based on the management program's own version of the content 412 of the related data object 408. Similar to the put request, the put response may be for multiple related data objects 408, or there may be a separate put response for each content 412 of each related data object 408.

Returning to FIG. 2, at 210, the management program 114(1) associated with the first entity 102(1) may issue a proposal request to the first blockchain node 116(1) associated with the first entity 102(1). For example, in response to receiving the put response 208, the management program 114(1) may create the proposal request and send the proposal request to the first blockchain node 116(1).

Figure 7:
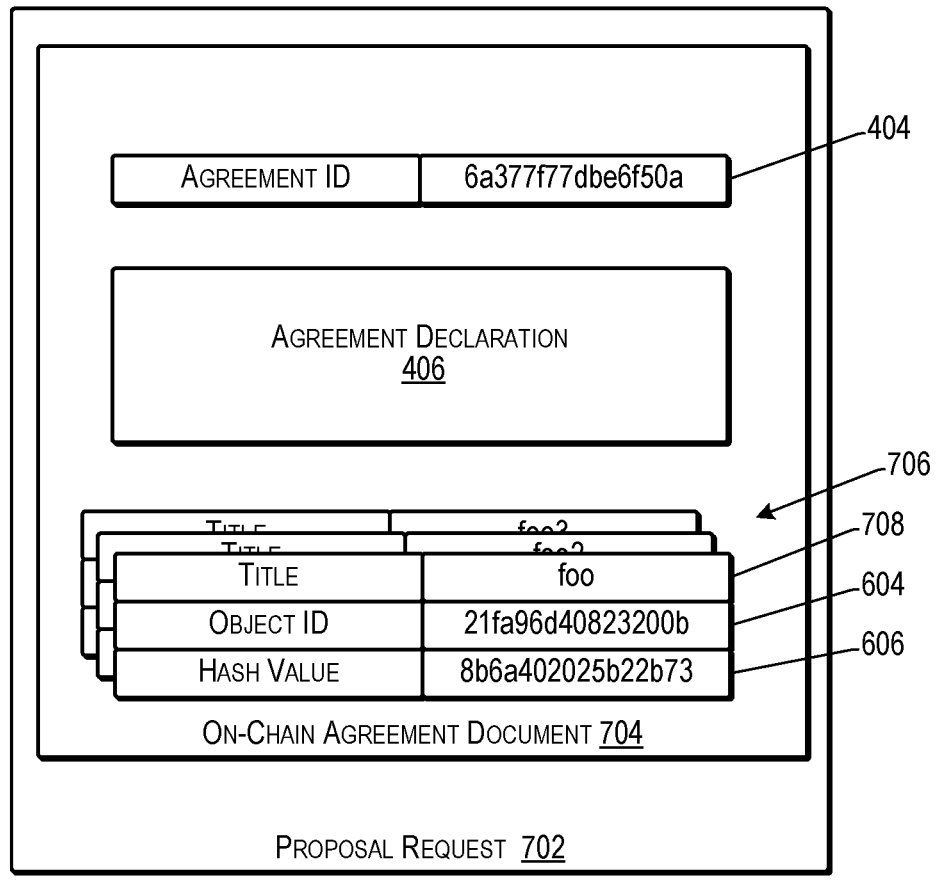
FIG. 7 illustrates an example data structure of a proposal request according to some implementations.

FIG. 7 illustrates an example data structure of a proposal request 702 according to some implementations. In this example, the proposal request 702 includes an on-chain agreement document 704. The on-chain agreement document 704 may be similar to the agreement request 402. Thus, the on-chain agreement document 704 may include the agreement ID 404 and the agreement declaration 406 discussed above. However, the one or more related data objects 408 are each replaced with a respective set of data object information 706 in place of the respective related data object 408. Each set of data object information 706 may include a title 708 of the related data object, the object ID 604, and the hash value 606, which may be determined from the agreement request 402 and the put response 230. The management program 114(1) sends the assembled proposal request 702 to the first blockchain node 116(1).

Returning to FIG. 2, at 212, the first blockchain node 116(1) associated with the first entity 102(1) may receive the proposal request and, in response, may send a proposal to the second blockchain node 116(2) associated with the second entity 102(2). For example, in response to receiving the proposal request, the first blockchain node 116(1) may create a proposal to send to the other blockchain nodes in the blockchain network.

Figure 8:
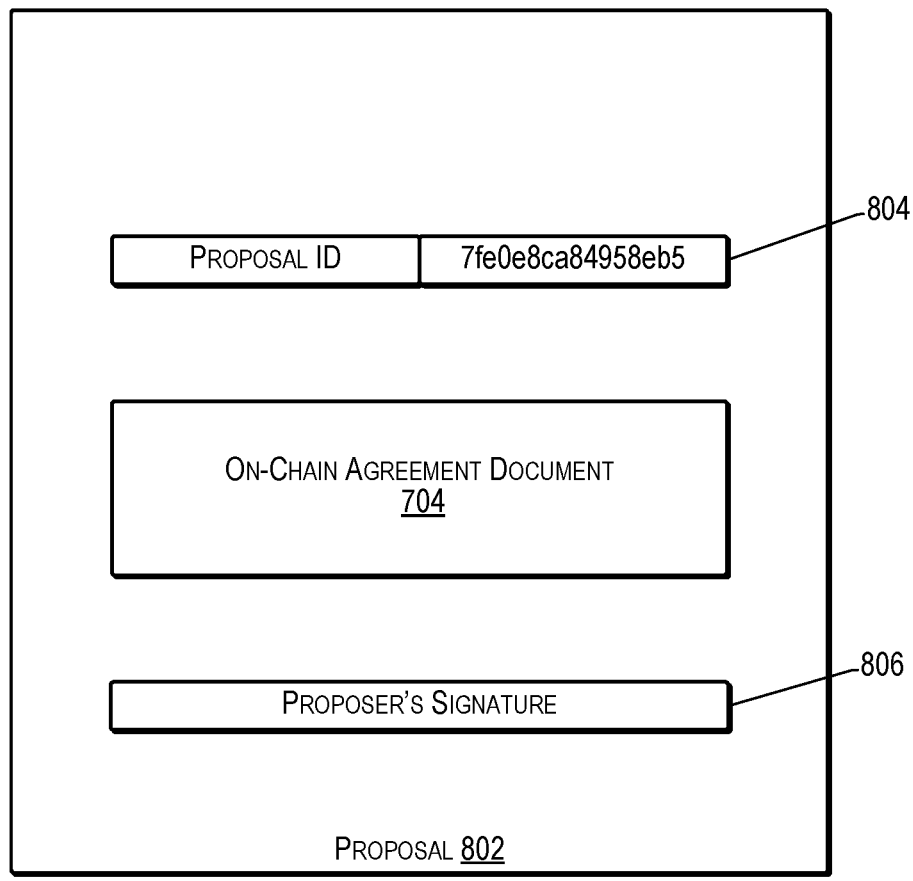
FIG. 8 illustrates an example data structure of a proposal according to some implementations.

FIG. 8 illustrates an example data structure of a proposal 802 according to some implementations. The proposal 802 may be generated based on the blockchain protocol, and, in this example, includes a proposal ID 804, the on-chain agreement document 704 that was included in the proposal request received from the management program 114(1), and a proposer's signature 806. For example, the proposer's signature may be a digital signature signed with the proposer's (i.e., the first entity's) credential. As one example, the digital signature may be an RSA (Rivest-Shamir-Adlemand) based digital signature, or any other suitable digital signature scheme known in the art. When the proposal 802 has been created, the first blockchain node 116(1) may send the proposal 802 to each of the other blockchain nodes in the blockchain network to enable the other blockchain programs 118 to confirm the proposal. For example, there may be one or more other entities that receive the proposal 802 in addition to the second entity 102(2), but the procedure carried out by these other entities may be the same or similar to that described herein for the second entity 102(2).

Returning to FIG. 2, at 214, the second blockchain node 116(2) associated with the second entity 102(2) receives the proposal and, in response, may send a proposal notification to the management program 114(2) associated with the second entity 102(2). For example, the proposal notification may simply include the received proposal 802 described above. Furthermore, before sending the proposal notification, the second blockchain node 116(2) may verify the proposer's digital signature to ensure the proposal is actually from the first entity 102(1). The management program 114(2) may receive the proposal notification 214 and may wait for an indication of completion of data transfer from the first entity.

At 216, the storage program 124(1) associated with the first entity 102(1) may complete data transfer to the storage program 124(2) associated with the second entity 102(2). For example, the storage program 124(1) may have sent all of the content associated with the agreement that will be stored off-chain for the agreement to the storage program 124(2) associated with the second entity 102(2). The storage program 124(2) may store the received content in an off-chain storage location, such as described elsewhere herein.

At 218, the storage program 124(2) associated with the second entity 102(2) may send a transfer completion notification to the management program 114(2) associated with the second entity 102(2). For example, the transfer completion notification may indicate to the management program 114(2) that all of the related data for the agreement has been received by the storage program 124(2) of the second entity 102(2).

Figure 9:
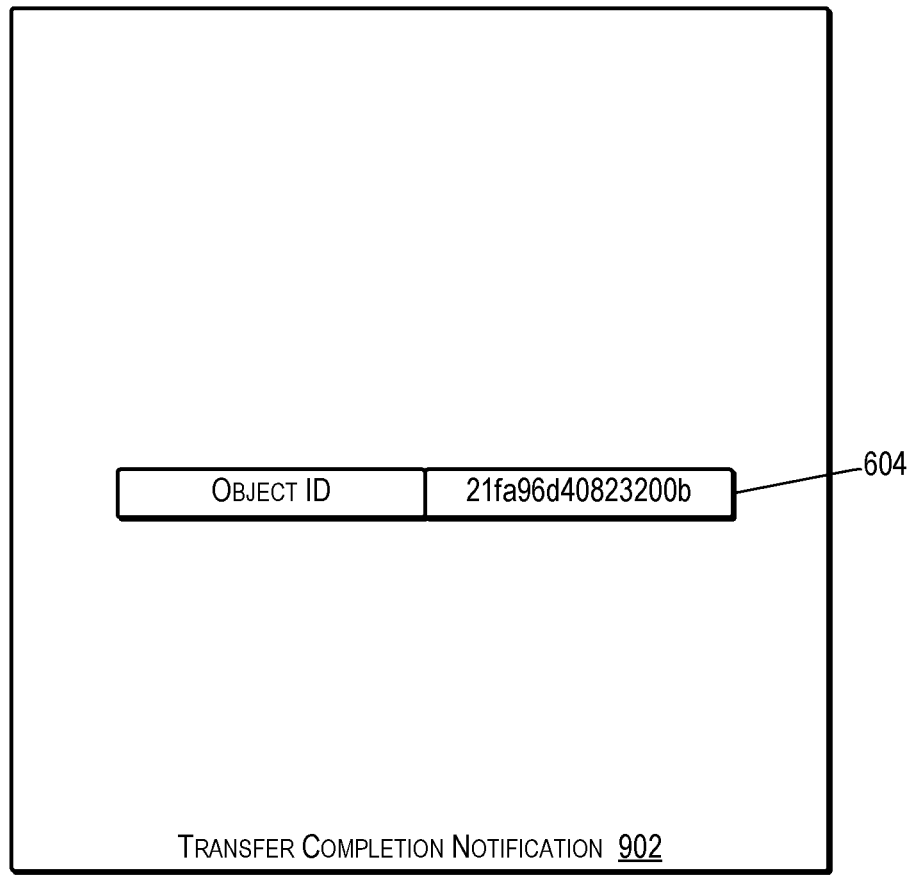
FIG. 9 illustrates an example data structure of a transfer completion notification according to some implementations.

FIG. 9 illustrates an example data structure of a transfer completion notification 902 according to some implementations. In this example, the transfer completion notification includes the object ID 604 of the related data object for which the content was transferred to the storage program 124(2) of the second entity. In some examples, when there are multiple related data objects, the transfer completion notification 902 may include a plurality of object IDs 604. Additionally, in other examples, rather than the storage program 124(2) sending a transfer completion notification autonomously, the management program 114(2) may poll the storage program 114(2) periodically following receipt of the proposal notification to determine when the data object content transfer is complete.

Returning to FIG. 2, at 220, following receipt of the proposal notification and the transfer completion notification, the management program 114(2) associated with the second entity 102(2) may send an examination request to the examiner program 110(2) associated with the second entity 102(2). For example, the examination request may include at least the on-chain agreement document 704 discussed above, e.g., with respect to FIG. 7.

Figure 10:
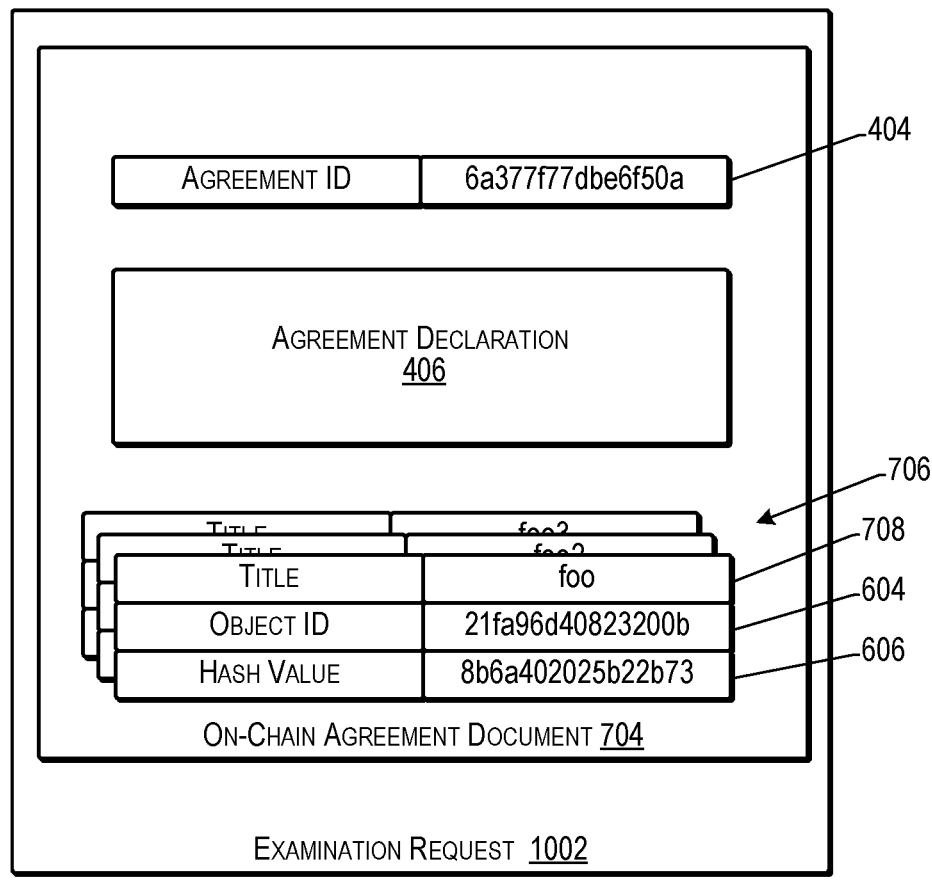
FIG. 10 illustrates an example data structure of an examination request according to some implementations.

FIG. 10 illustrates an example data structure of an examination request 1002 according to some implementations. In this example, the examination request 1002 includes the on-chain agreement document 704 received in the proposal 802, including the agreement ID 404, the agreement declaration 406, and one or more sets of data object information 706, including a title 708, the object ID 604, and the hash value 606 for each related data object.

Returning to FIG. 2, at 222, the examiner program 110(2) associated with the second entity 102(2) may examine the received on-chain agreement document 704, and in response, may send a get request to the storage program 124(2) associated with the second entity 102(2). For example, the get request may request access to the content of the related data objects identified in the on-chain agreement document 704.

Figure 11:
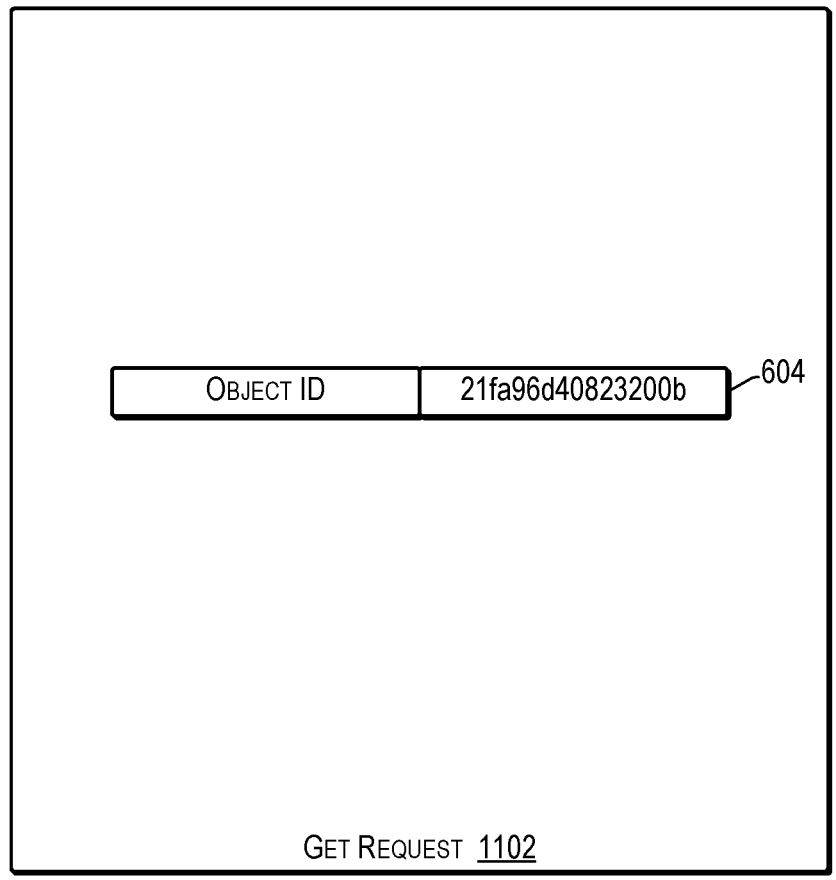
FIG. 11 illustrates an example data structure of a get request according to some implementations.

FIG. 11 illustrates an example data structure of a get request 1102 according to some implementations. In this example, the get request 1102 includes the object ID 604 for each related data object for which the examiner program 110(2) intends to verify the content.

Returning to FIG. 2, at 224, the storage program 124(2) associated with the second entity 102(2) may receive the get request at 222 and, in response, may send a get response to the examiner program 110(2) associated with the second entity 102(2). For example, the get response may include the requested content.

Figure 12:
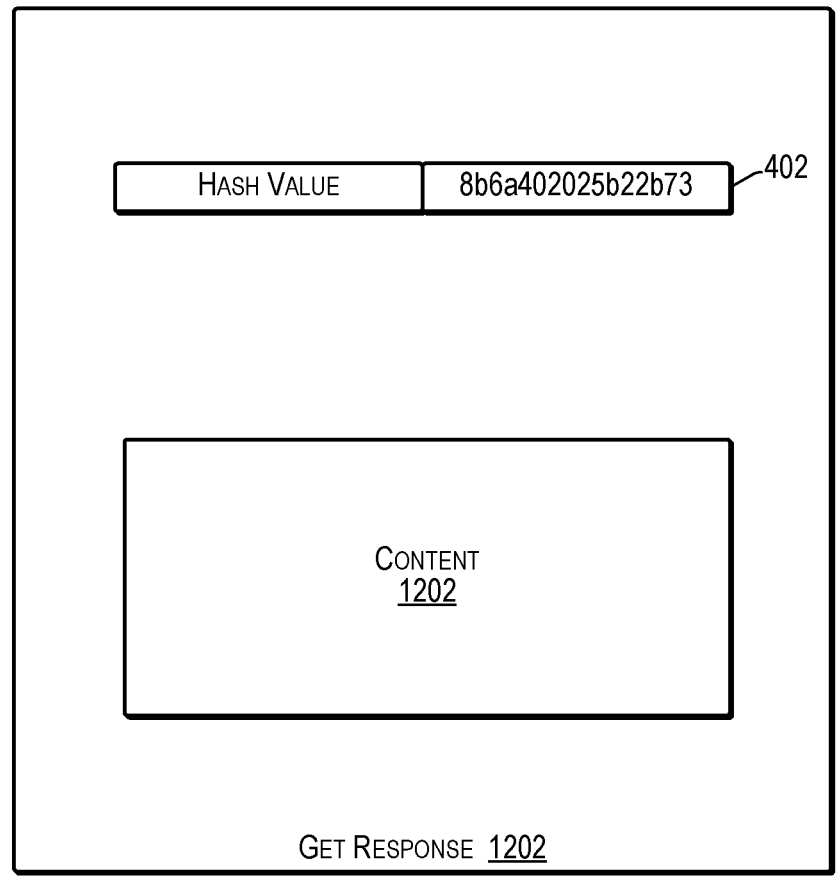
FIG. 12 illustrates an example data structure of a get response according to some implementations.

FIG. 12 illustrates an example data structure of a get response 1202 according to some implementations. In this example, the get response 1202 includes content 412 for each respective related data object, and in some examples, the get response 1202 may also include the hash value 606 corresponding to the content 412. Alternatively, in other examples, the examiner program 110(2) may determine the hash value from the content.

Returning to FIG. 2, at 226, the examiner program 110(2) associated with the second entity 102(2) may receive the get response, examine the received content, and may send an examination response to the management program 114(2) associated with the second entity 102(2). For example, the examiner program 110(2) may reconstruct the related data object from the title, object ID, and hash value included in the on-chain agreement document received from the management program and using the content received in the get response. If the hash value received from the management program does not match the hash value of the content received in the get response, the examiner program may terminate the examination and indicate a failure condition. In this case, the examiner program may reply to the management program with an examination response that indicates the failure condition. On the other hand, if the hash verification is successful, i.e., the hash value received in the on chain agreement document from the management program matches the hash value of the content received in the get response, then the examiner program may send an examination response indicating that examination has been successful.

In addition, in some examples, prior to sending the examination response at 226, the examiner program 110(2) may perform additional examination of the on-chain agreement document and the related data objects. For instance, the examiner program 110(2) may compare a part of the agreement document and the related data objects to ensure that the related data object(s) supports the agreement described. For example, the examiner program 110(2) may determine that the company name written in a scanned image of a legal license document as a related data object is the same as the company name in the agreement document. In addition, the examiner program 110 may examine the content of the related data objects for any evidence of fabrication or other alteration of the related data objects. As yet another example, the examiner program 110 may examine the items, people, organizations, or other entities contained in or otherwise referred to by the related data object such as by checking to determine whether these are a match with a whitelist, blacklist, or the like. For example, at the examiner program 110 may look up facial images for comparison with a database including mugshots of criminals or the like. Numerous other types of examination techniques and processes will be apparent to those of skill in the art having the benefit of the disclosure herein.

Figure 13:
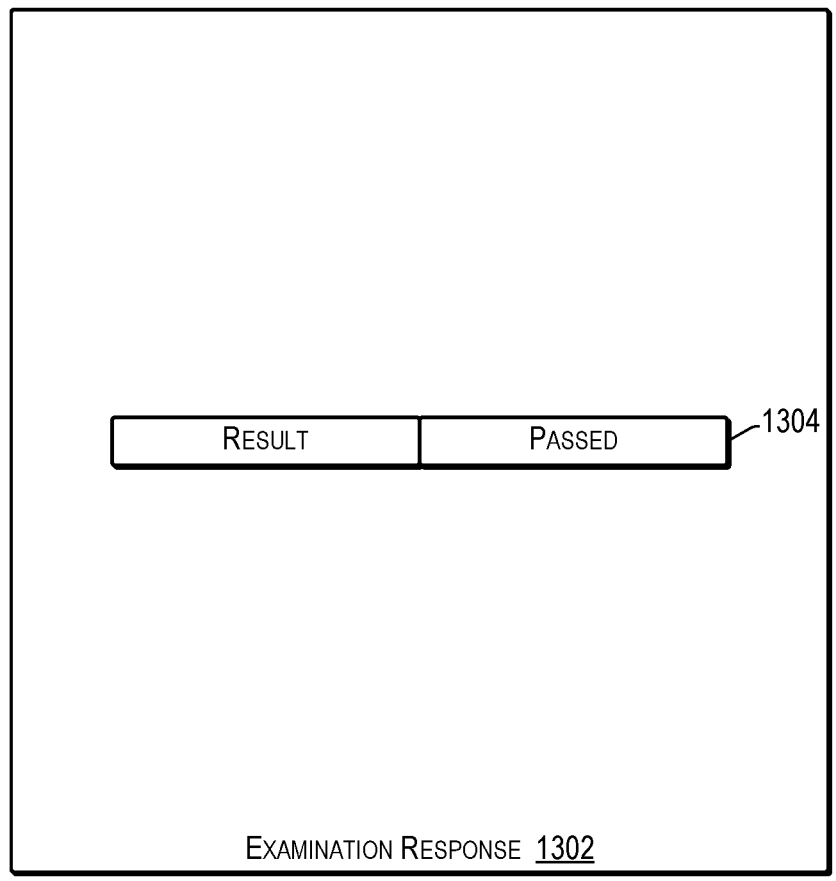
FIG. 13 illustrates an example data structure of an examination response according to some implementations.

FIG. 13 illustrates an example data structure of an examination response 1302 according to some implementations. In this example, the examination response 1302 includes a result 1304 which may indicate either that the examination passed or failed. Additionally, in other examples, if the examination passes or fails, the examination response may include one or more reasons for the examination result such as a reason why the examination failed, or may list various factors that may have been examined and were determined to have passed in the case that the result 1304 indicates that the examination passed.

Returning to FIG. 2, at 220, in response to receiving an indication that the examination passed, the management program 114(2) associated with the second entity 102(2) may send an endorsement request to the second blockchain node 116(2) associated with the second entity 102(2). On the other hand, if the examination response indicates a failure, the management program 114(2) may send a notification to the user program 106(2) (not shown in FIG. 2) associated with the second entity 102(2) to indicate a problem with the agreement. In the case that the examination passes successfully, the management program 114(2) creates an endorsement request and sends the endorsement request to the second blockchain node 116(2) to request that the blockchain program 118(2) send an endorsement of the agreement to the blockchain network.

Figure 14:
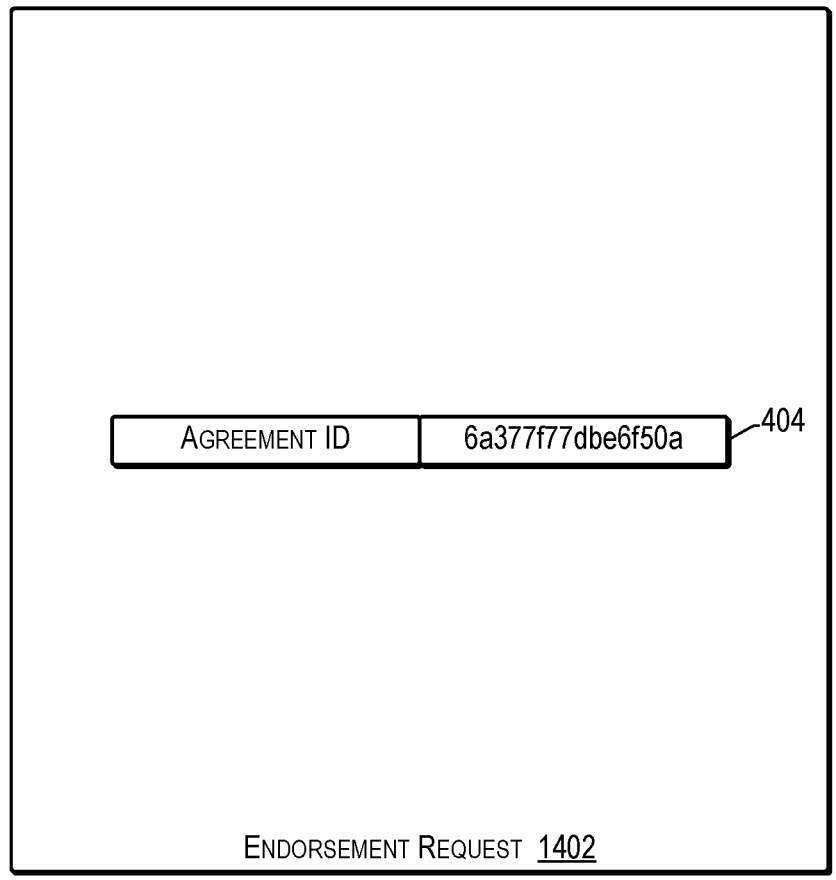
FIG. 14 illustrates an example data structure of an endorsement request according to some implementations.

FIG. 14 illustrates an example data structure of an endorsement request 1402 according to some implementations. In this example, the endorsement request 1402 includes the agreement ID 404 for the particular agreement for which the examination was performed. The endorsement request may request that the blockchain program 118 endorse the specified agreement according to the blockchain protocol of the blockchain network.

Returning to FIG. 2, at 230, in response to receiving the endorsement request, the second blockchain node 116(2) associated with the second entity 102(2) may send an endorsement to the first blockchain node 116(1) associated with the first entity 102(1). For example, the endorsement may be prepared and transmitted based on the protocols followed by the blockchain network in which the blockchain nodes 116(2) and 116(1) participate. In addition, the endorsement may be sent to any other blockchain nodes in the blockchain network that may have received the proposal sent at 212.

Figure 15:
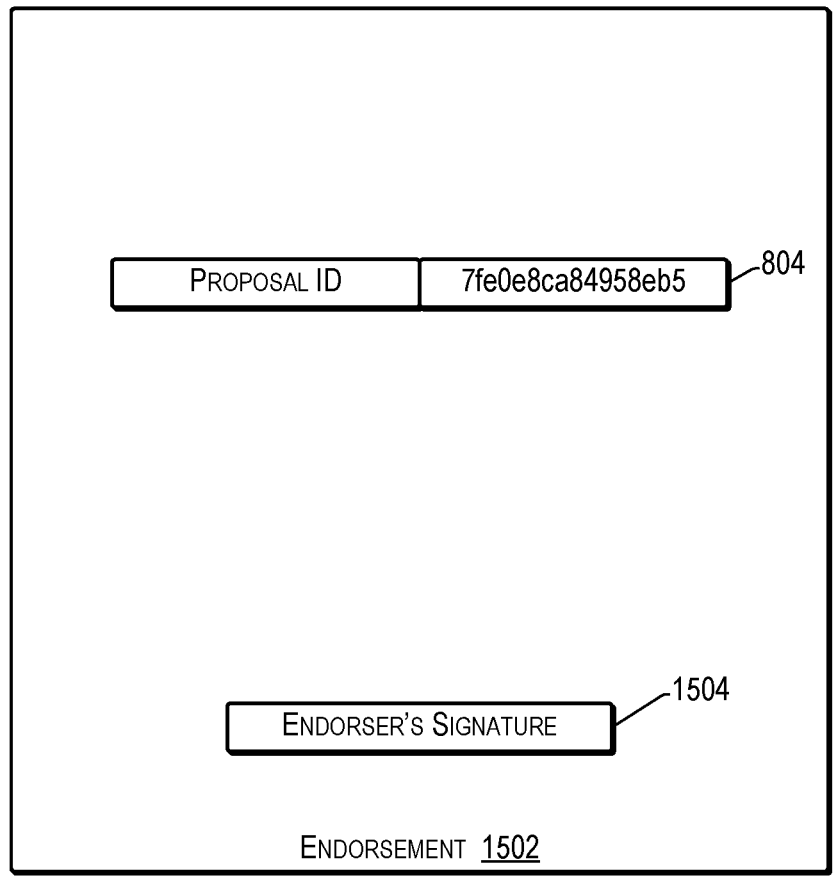
FIG. 15 illustrates an example data structure of an endorsement according to some implementations.

FIG. 15 illustrates an example data structure of an endorsement 1502 according to some implementations. In this example, the endorsement 1502 includes the proposal ID 804 received in the proposal received from the first entity at 212. The endorsement 1502 may further include an endorser's signature 1504. Similar to the proposer's signature mentioned above in connection with the proposal sent at 212, the endorser's signature may be a digital signature such as an RSA signature or any other type of digital signature used by the blockchain network to indicate endorsement of the on-chain agreement document provided as part of the proposal at 212.

Returning to FIG. 2, at 232, in response to receiving the endorsement from the second entity, as well as endorsements from any other entities participating in the blockchain network who may have received a proposal at 212, the first blockchain node 116(1) associated with the first entity 102(1) may send an agreement propagation to the second blockchain node 116(2) associated with the second entity 102(2) and the other entities. For example, the first blockchain node 116(1) may verify the signature(s) of the endorser(s) and may record which blockchain node of which entity sent an endorsement for the proposal. The first blockchain node 116(1) may further determine whether a sufficient number of endorsements have been received from the blockchain network. The number of endorsements required may depend upon the particular agreement, but typically may include receiving an endorsement from all stakeholders involved in the agreement and from at least one supervisor of the agreement, if any. When the first blockchain node 116(1) has determined that the number of endorsements received is greater than or equal to the required number of endorsements, the first blockchain node 116(1) may generate and send an agreement propagation to all blockchain nodes in the blockchain network, i.e., to each blockchain program 118 executing on a separate computing device in the blockchain network. Alternatively, in some examples, the blockchain program 118 may not be required to send the agreement propagation directly to the other blockchain nodes 116 as there may be one or more proxies in place to send the agreement propagation to the other blockchain nodes 116.

Figure 16:
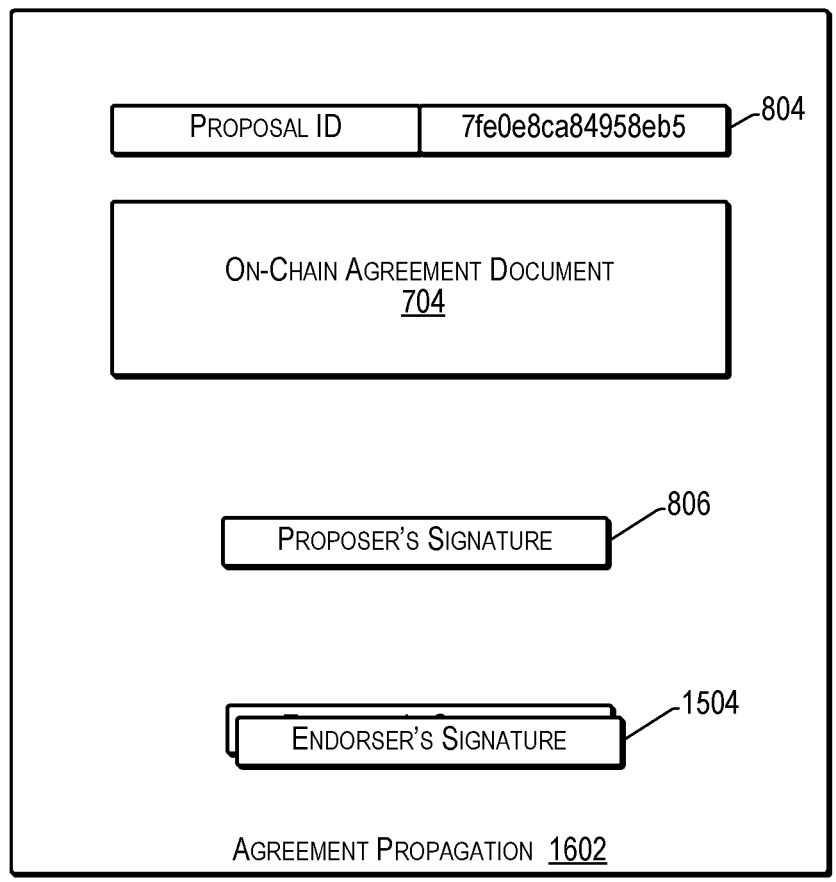
FIG. 16 illustrates an example data structure of an agreement propagation according to some implementations.

FIG. 16 illustrates an example data structure of an agreement propagation 1602 according to some implementations. In this example, the agreement propagation 1602 includes the proposal ID 804, the on-chain agreement document 704, the proposer's signature 806, and the one or more endorser's signatures 1504, to indicate the content of the agreement and to indicate that the agreement has been confirmed by the required entities.

Returning to FIG. 2, at 234, the second blockchain node 116(2) associated with the second entity 102(2) may receive the agreement propagation, store a new block to its own blockchain, and in response may send an agreement propagation acknowledgment to the first blockchain node 116(1) associated with the first entity 102(1). For example, upon receipt of the agreement propagation, the second blockchain node 116(2) may verify the proposer's signature, the endorser's signature(s), and may store the information in the agreement propagation to a new block on the blockchain managed by the respective second blockchain node 116(2). Accordingly, each blockchain node participating in the blockchain network may add a new block to the blockchain managed by that blockchain node. In addition, the second blockchain node 116(2) (and the other blockchain nodes) (not shown in FIG. 2) may generate an agreement propagation acknowledgment and may send this to the first blockchain node 116(1) associated with the first entity 102(1).

Figure 17:
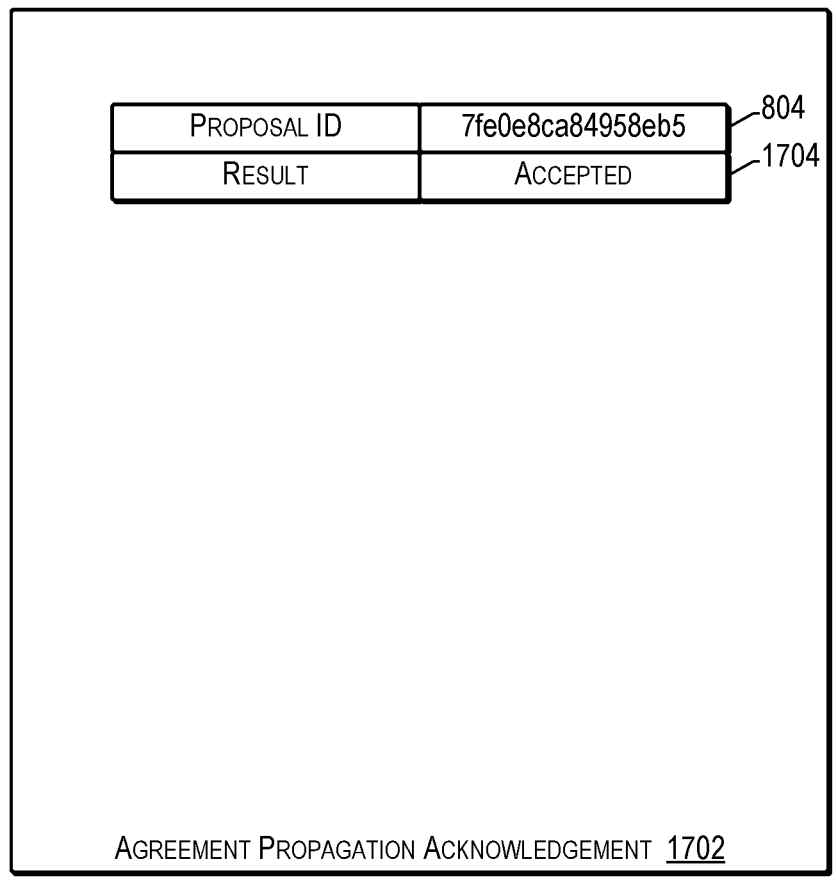
FIG. 17 illustrates an example data structure of an agreement propagation acknowledgment according to some implementations.

FIG. 17 illustrates an example data structure of an agreement propagation acknowledgment 1702 according to some implementations. In this example, the agreement propagation acknowledgment 1702 includes the proposal ID 804 as well as a result 1704 of the agreement propagation which may indicate that the agreement propagation was accepted by the respective blockchain node.

Returning to FIG. 2, at 236, first blockchain node 116(1) associated with the first entity 102(1), after receiving the agreement propagation acknowledgments from the other blockchain nodes in the blockchain network, may send an agreement propagation notification to the management program 114(1) associated with the first entity 102(1). For example, the agreement propagation notification may indicate to the management program that the agreement has been recorded on the blockchain in the blockchain network.

Figure 18:
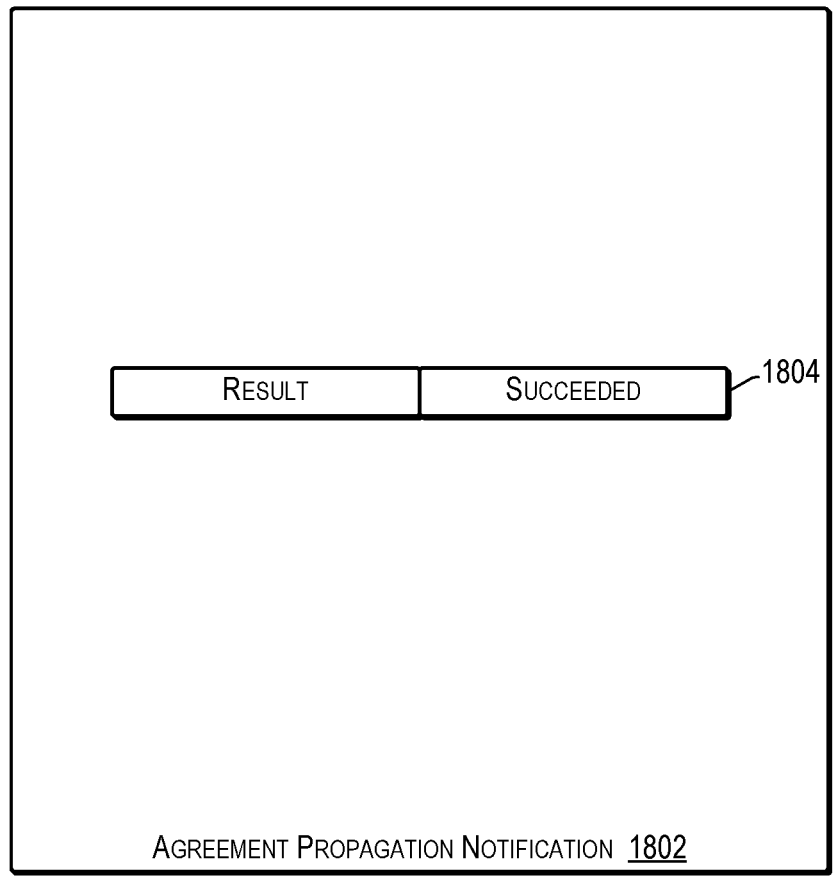
FIG. 18 illustrates an example data structure of an agreement propagation notification according to some implementations.

FIG. 18 illustrates an example data structure of an agreement propagation notification 1802 according to some implementations. In this example, the agreement propagation notification 1802 includes a result 1804 which may indicate that the agreement has been successfully recorded on the blockchain.

Returning to FIG. 2, at 238, in response to receiving the agreement propagation notification, the management program 114(1) associated with the first entity 102(1) may send an agreement status notification to the user application 106(1) associated with the first entity 102(1). For example, the management program 114(1) may indicate to a user associated with the user application 106(1) that the agreement has been accepted and successfully recorded on the blockchain managed by the blockchain network, and that the related data associated with the agreement has been verified by the other entit(ies) participating in the agreement.

Figure 19:
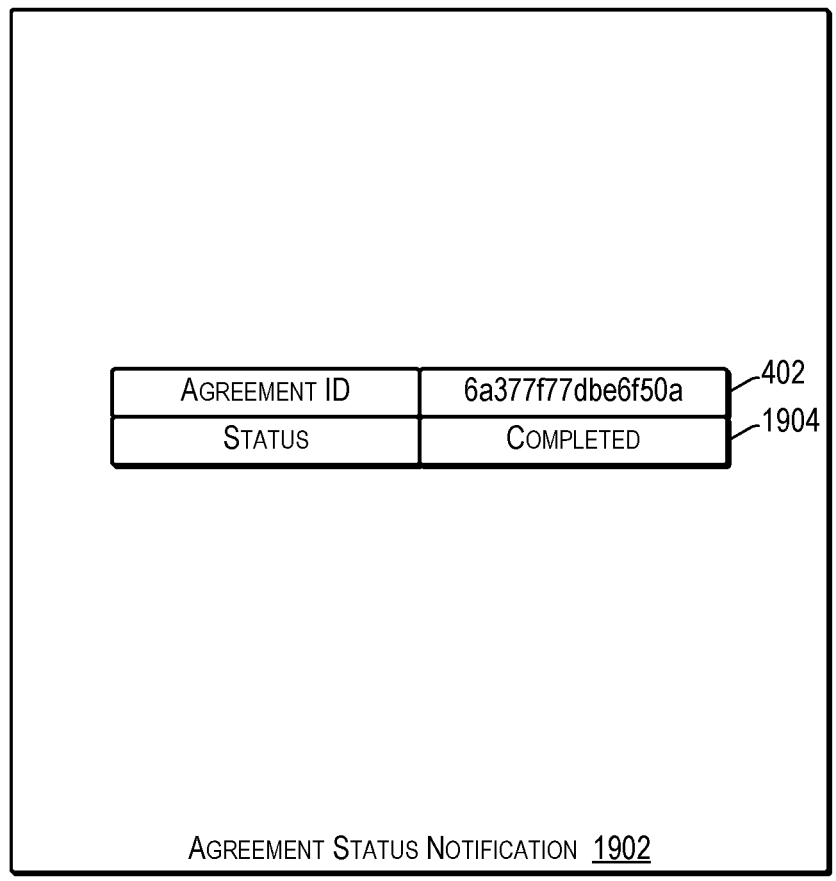
FIG. 19 illustrates an example data structure of an agreement status notification according to some implementations.

FIG. 19 illustrates an example data structure of an agreement status notification 1902 according to some implementations. In this example, the agreement status notification 1902 includes the agreement ID 404 and a status indicator 1904 indicating that the status of the agreement is completed. Of course, in the case that the agreement was not accepted or recorded on the blockchain, the status may indicate a failure, and the user associated with the first entity 102(1) may perform additional steps to determine the cause of the failure.

As mentioned above, FIG. 3 is a sequence diagram illustrating an example process 300 for asynchronous verification of related data according to some implementations. In this example, operations 202, 204, 208, 210, 212, and 214, and associated data structures, are the same as, or similar to, those described above with respect to FIG. 2. In this case however, the data transfer does not start after operation 204, but instead is performed asynchronously as described below.

In the example of FIG. 3, the system configuration may include the same participants for each entity, and thus, the system configuration may be the same. However, the example process 300 of FIG. 3 allows proposal of the agreement or other transaction asynchronously with examination of the agreement or other transaction and the related data. The enables the proposing entity (i.e., the first entity 102(1) in this example) to immediately ensure that the agreement has been shared with other entities in an immutable state as a candidate agreement without having to wait for related data verification. Additional benefits of the example of FIG. 3 include that the data transfer among off-chain storage nodes (i.e., computing devices executing instances of the storage program 124) may be executed in a batch fashion, such as by bundling content of multiple objects for the same agreement or for multiple agreements, or in any other manners that is optimal for the storage nodes. In addition, the example of FIG. 3 enables the examination process can be more detailed or otherwise more extensive. The examination process may also be executed as batch processing, so as during idle time or low usage times.

At 202, the user application 106(1) associated with the first entity 102(1) may issue an agreement request similar to the example discussed above with respect to FIGS. 2 and 4. The agreement request may have at least one related data object that will be stored off-chain, such as due to the storage size of the related data object.

At 204, the management program 114(1) associated with the first entity 102(1) may issue a put request to the storage program 124(1) associated with the first entity 102(1). Accordingly, in response to the put request, the storage program 124(1) may store the content on the off-chain storage. However, in this example, rather than immediately beginning data transfer to the second entity 102(2), the storage program 124(1) may defer data transfer of the content of the to a later time, and may wait for a trigger or other indication to begin the data transfer to the other entit(ies).

At 208, the storage program 124(1) associated with the first entity 102(1) may issue a put response to the management program 114(1). For example, the storage program 124(1) may send the put response to the management program to indicate the object ID associated with each content 412 of each related data object 408. The put response may also include a hash value calculated from the content 412 of the related data object 408 that corresponds to the object ID.

At 210, the management program 114(1) associated with the first entity 102(1) may issue a proposal request to the first blockchain node 116(1) associated with the first entity 102(1). For example, in response to receiving the put response 208, the management program 114(1) may create the proposal request and send the proposal request to the first blockchain node 116(1).

At 212, the first blockchain node 116(1) associated with the first entity 102(1) may receive the proposal request and, in response, may send a proposal to the second blockchain node 116(2) associated with the second entity 102(2). For example, in response to receiving the proposal request, the first blockchain node 116(1) may create a proposal to send to the other blockchain nodes in the blockchain network.

At 214, the second blockchain node 116(2) associated with the second entity 102(2) receives the proposal and, in response, sends a proposal notification to the management program 114(2) associated with the second entity 102(2). For example, the proposal notification may simply include the received proposal 802 described above. Furthermore, before sending the proposal notification, the second blockchain node 116(2) may verify the proposer's digital signature to ensure the proposal is actually from the first entity 102(1). The management program 114(2) may receive the proposal notification 214. In this example, however, rather than waiting for an indication of completion of data transfer from the first entity, the management program may proceed with requesting pre-examination of the received proposal.

At 302, following receipt of the proposal notification at 214 from the second blockchain node 116(2) associated with the second entity 102(2), and based on a proposal received at 212 from the first blockchain node 116(1) associated with the first entity 102(1), the management program 114(2) may send a pre-examination request to the examiner program 110(2) associated with the second entity 102(2). For example, the pre-examination request may include at least the on-chain agreement document 704 discussed above, e.g., with respect to FIG. 7. In addition, the management program 114(2) may store a copy of the on-chain agreement document locally.

Figure 20:
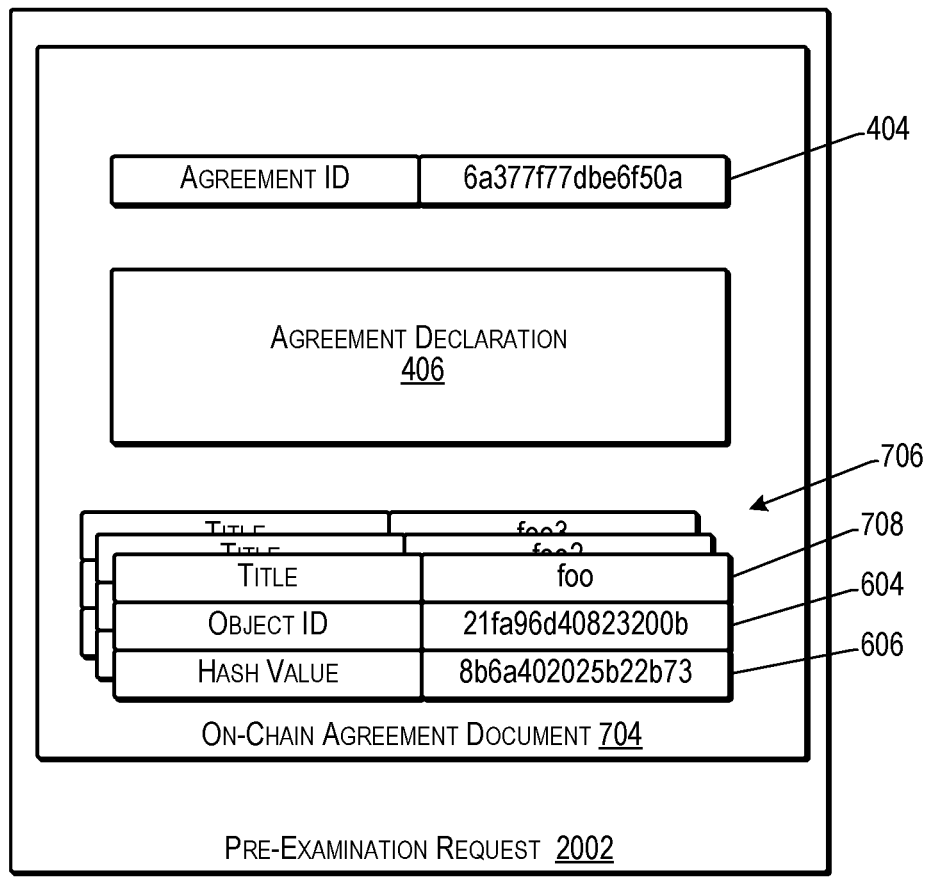
FIG. 20 illustrates an example data structure of a pre-examination request according to some implementations.

FIG. 20 illustrates an example data structure of a pre-examination request 2002 according to some implementations. In this example, the pre-examination request 2002 includes the on-chain agreement document 704 received in the proposal 802, including the agreement ID 404, the agreement declaration 406, and one or more sets of data object information 706, including a title 708, the object ID 604, and the hash value 606 for each related data object. The pre-examination request 2002 differs from examination request in that the examiner program is not requested to examine the related data object associated with the proposal that will be stored off-chain in the off-chain storage.

Returning to FIG. 3, at 304, the examiner program 110(2) associated with the second entity 102(2) may perform a pre-examination of the on-chain agreement document and may send a pre-examination response to the management program 114(2) associated with the second entity 102(2). For example, The examiner program 110(2) receives the pre-examination request 2002 and may examine only the agreement declaration of the on-chain agreement document 704 to make ensure that the agreement declaration is for the second entity 102(2) and complies with any other preconditions for an agreement. Upon completing the examination successfully, the examiner program 110(2) may responds with a pre-examination response, which is almost same as the examination response discussed above with respect to FIGS. 2 and 13, but differs in that the result is only for the agreement declaration and is not a compete examination response that would indicate a full examination.

Figure 21:
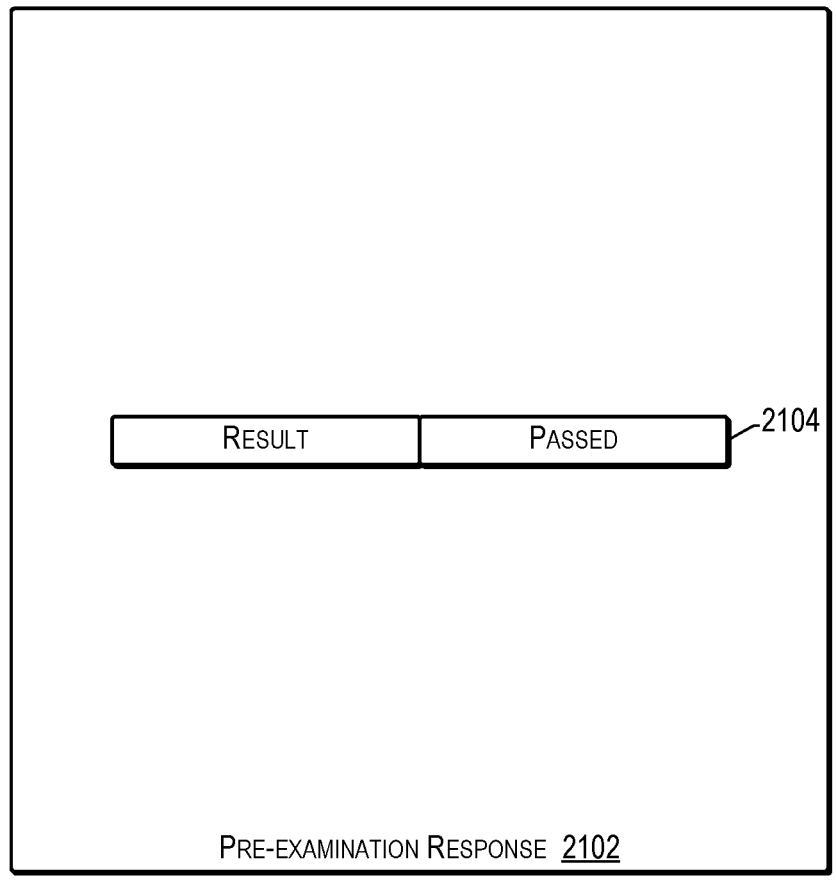
FIG. 21 illustrates an example data structure of a pre-examination response according to some implementations.

FIG. 21 illustrates an example data structure of a pre-examination response 2102 according to some implementations. In this example, the pre-examination response to 2102 includes a result 2104, which may indicate either that the pre-examination passed or failed.

Returning to FIG. 3, at 306, in response to receiving the pre-examination response, the management program 114(2) associated with the second entity 102(2) may send an acknowledgment request to the second blockchain node 116(2) associated with the second entity 102(2). For example, the management program 114 may prepare an acknowledgment request that indicates that the agreement has been provisionally accepted pending further examination upon receipt of the related data object content. Additionally, in other examples, the pre-examination steps may be skipped and the process may proceed directly from 214 to 306.

Figure 22:
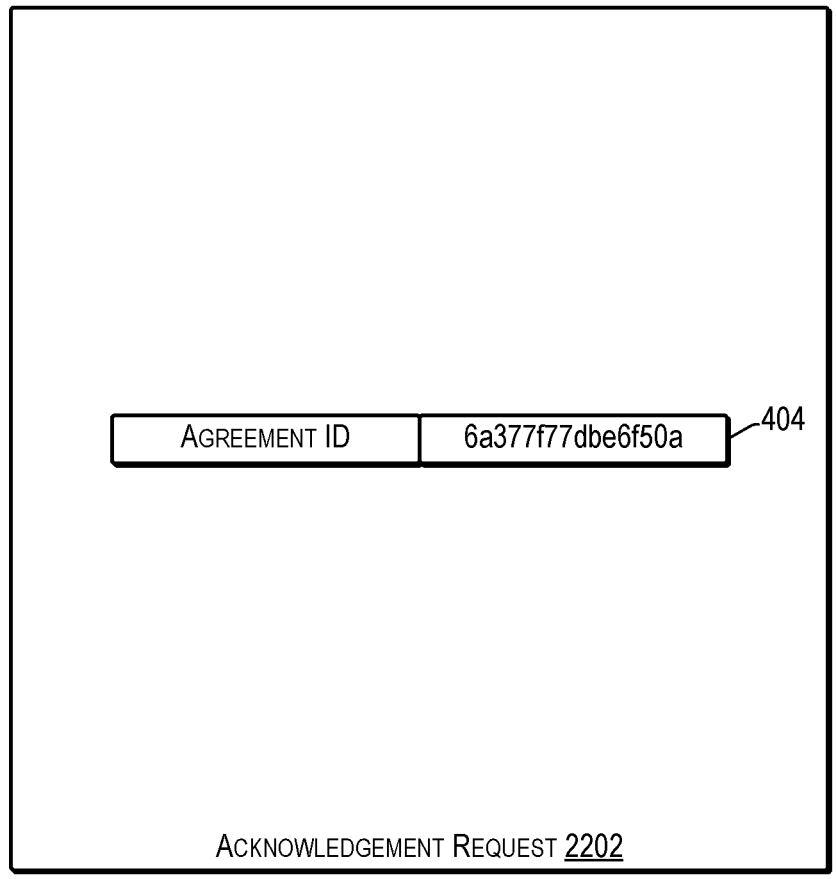
FIG. 22 illustrates an example data structure of an acknowledgment request according to some implementations.

FIG. 22 illustrates an example data structure of an acknowledgment request 2202 according to some implementations. In this example, the acknowledgment request 2202 includes the agreement ID 404 for the agreement. In this case, the acknowledgment request does not indicate that the agreement proposal is being endorsed but only that the second entity acknowledges receiving the proposal.

Returning to FIG. 3, at 308, in response to receiving the acknowledgment request, the second blockchain node 116(2) associated with the second entity 102(2) may send an acknowledgment to the first blockchain node 116(1) associated with the first entity 102(1). For example, the acknowledgment may be similar to the endorsement discussed above with respect to FIG. 2 but does not mean an endorsement of the agreement proposal, but rather, only acknowledgment that the proposal has been received by the second entity.

Figure 23:
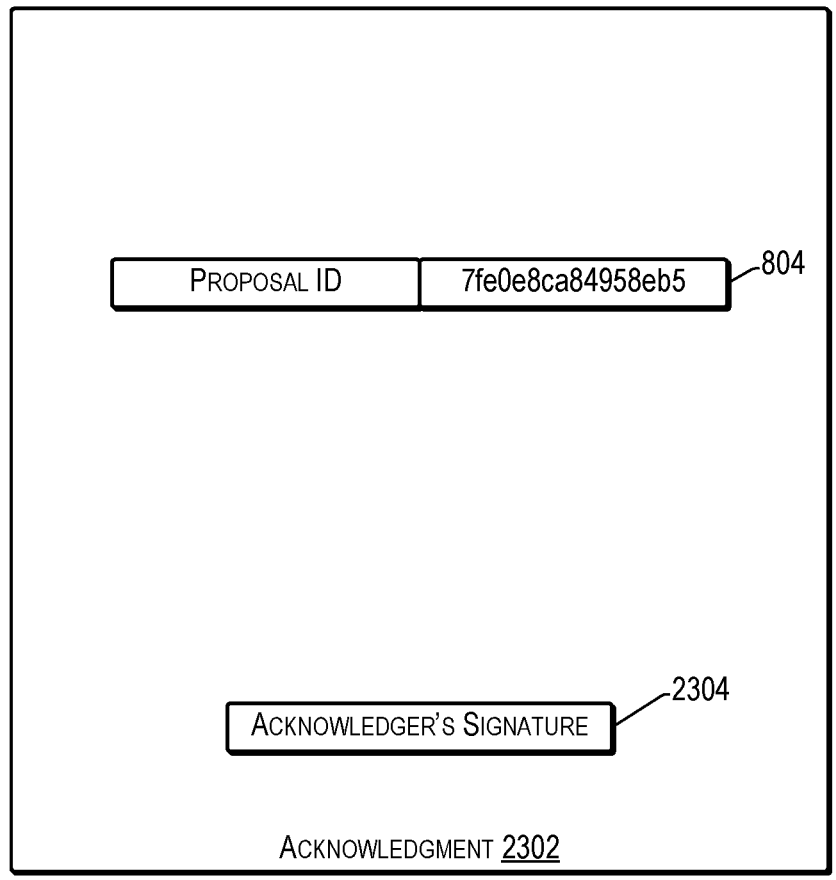
FIG. 23 illustrates an example data structure of an acknowledgment according to some implementations.

FIG. 23 illustrates an example data structure of an acknowledgment 2302 according to some implementations. In this example, the acknowledgment 2302 includes the proposal ID 804 and an acknowledger's signature 2304. Similar to the proposer's signature mentioned above in connection with the proposal sent at 212, the acknowledger's signature 2304 may be a digital signature such as an RSA signature or any other type of digital signature used by the blockchain network to indicate acknowledgment of the agreement declaration provided as part of the proposal at 212.

Returning to FIG. 3, at 310, in response to receiving the acknowledgment from the second entity, as well as acknowledgments from any other entities participating in the blockchain network who may have received the proposal at 212, the first blockchain node 116(1) associated with the first entity 102(1) may determine that the state of the agreement has transitioned to an intermediate state, and may send an intermediate agreement propagation to the second blockchain node 116(2) associated with the second entity 102(2), as well as to the other blockchain nodes participating in the blockchain network. For example, when the agreement is in the intermediate state, the agreement is conditionally accepted by the entities that are parties to the agreement, with the condition being that the agreement and the associated related data object pass further examination of the agreement and the related data objects.

Figure 24:
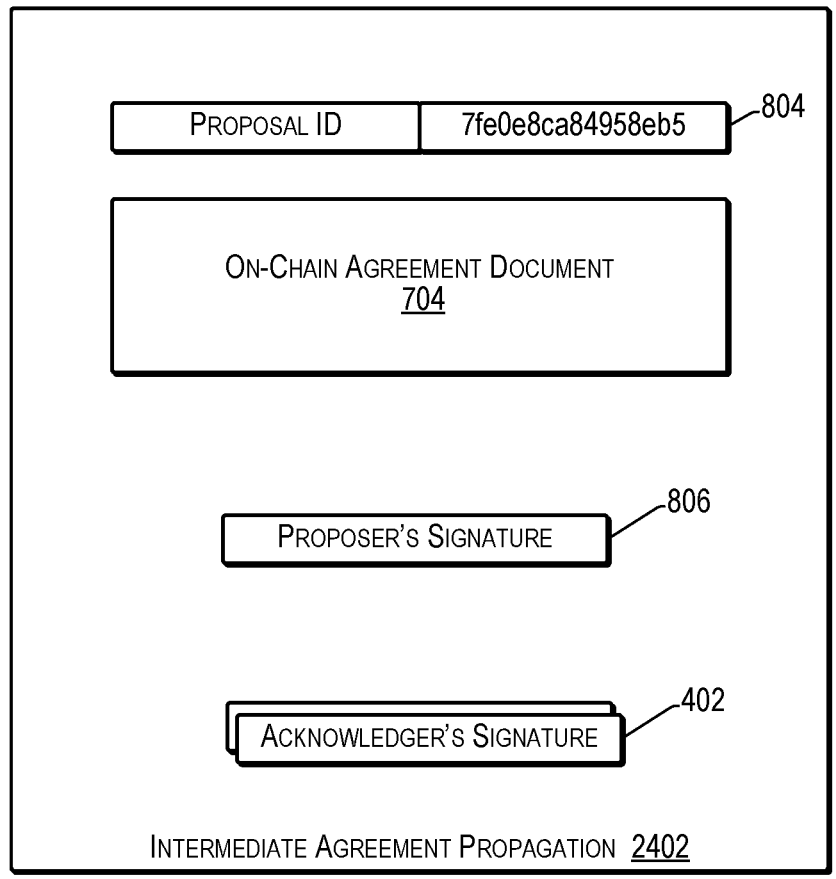
FIG. 24 illustrates an example data structure of an intermediate agreement propagation according to some implementations.

FIG. 24 illustrates an example data structure of an intermediate agreement propagation 2402 according to some implementations. In this example, the intermediate agreement propagation 2402 includes the proposal ID 804, the on-chain agreement document 704, the proposer's signature 806, and the one or more acknowledger's signatures 2304, to indicate the content of the agreement and to indicate that the agreement has been conditionally accepted by the participating entities.

Returning to FIG. 3, at 312, the second blockchain node 116(2) associated with the second entity 102(2) may receive the agreement propagation, store a new block to its own blockchain, and in response may send an intermediate agreement propagation acknowledgment to the first blockchain node 116(1) associated with the first entity 102(1). For example, upon receipt of the intermediate agreement propagation, the second blockchain node 116(2) may verify the proposer's signature, the acknowledger's signature(s), and may store the information in the intermediate agreement propagation to a new block on the blockchain managed by the respective second blockchain node 116(2). Accordingly, each blockchain node participating in the blockchain network may add a new block to the blockchain managed by that blockchain node. In addition, the second blockchain node 116(2) (and the other blockchain nodes) (not shown in FIG. 3) may generate an intermediate agreement propagation acknowledgment and may send this to the first blockchain node 116(1) associated with the first entity 102(1).

Figure 25:
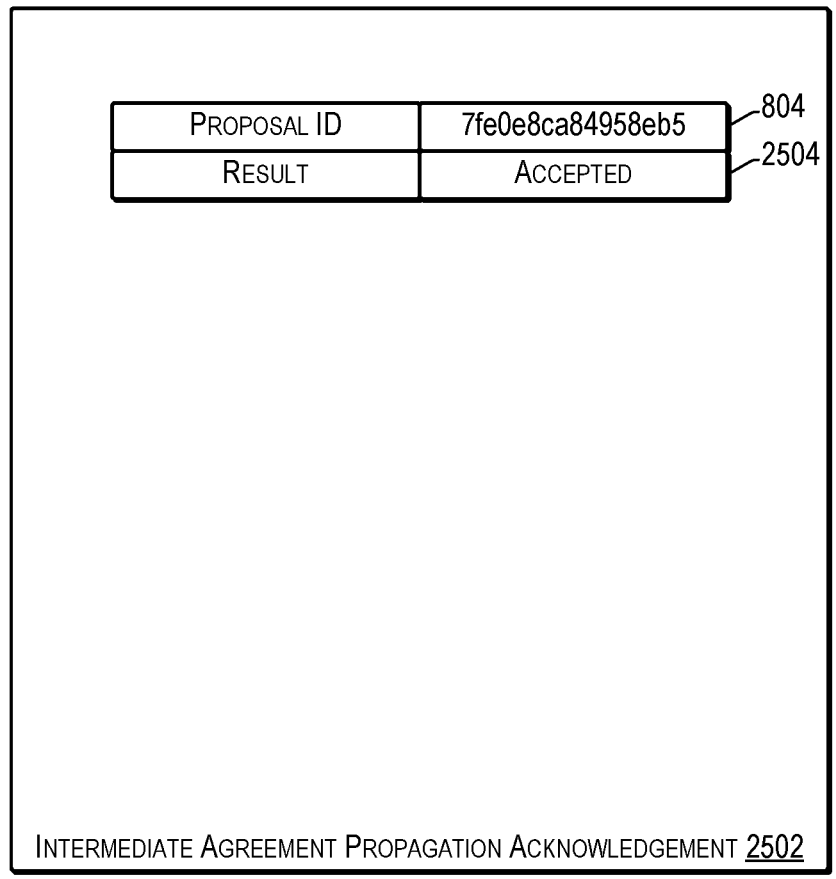
FIG. 25 illustrates an example data structure of an intermediate agreement propagation acknowledgment according to some implementations.

FIG. 25 illustrates an example data structure of an intermediate agreement propagation acknowledgment 2502 according to some implementations. In this example, the intermediate agreement propagation acknowledgment 2502 includes the proposal ID 804 and a result 2504 indicating that the intermediate agreement has either been accepted or rejected by the respective blockchain node.

Returning to FIG. 3, at 314, the first blockchain node 116(1) associated with the first entity 102(1) after receiving the intermediate agreement propagation acknowledgments from the other blockchain nodes in the blockchain network, may send an intermediate agreement propagation notification to the management program 114(1) associated with the first entity 102(1). For example, the intermediate agreement propagation notification may indicate to the management program 114(1) that the agreement has been recorded on the blockchain in the blockchain network.

Figure 26:
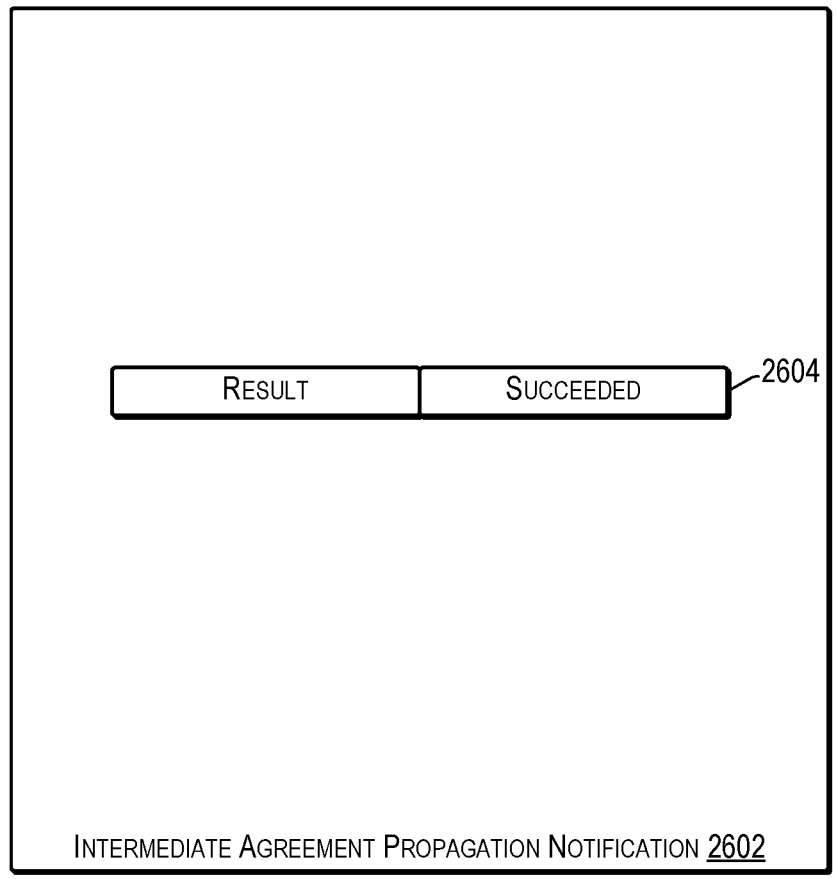
FIG. 26 illustrates an example data structure of an intermediate agreement propagation notification according to some implementations.

FIG. 26 illustrates an example data structure of an intermediate agreement propagation notification 2602 according to some implementations. In this example, the agreement propagation notification 2602 includes a result 2604 which may indicate that the intermediate agreement has been successfully recorded on the blockchain.

Returning to FIG. 3, at 316, the management program 114(1) associated with the first entity 102(1) may send an intermediate agreement status notification to the user application 106(1) associated with the first entity 102(1). The data structure of the intermediate agreement status notification may be the same or similar to the agreement status notification discussed above with respect to FIG. 19, with the status 1904 indicating "recorded" or the like. For example, at this point, the agreement is not completed, but is now recorded and therefore immutable in the view of the blockchain network. Accordingly, the agreement is in an "on-hold" or otherwise conditional state until the data transfer has been completed and the transferred related data has been examined or otherwise verified to satisfy the condition for completing the agreement.

At 318, data transfer may be triggered, or otherwise caused to begin, at the storage program 124(1) associated with the first entity 102(1). In response, the storage program 124(1) may begin transfer of the related data to the storage program 124(2) associated with the second entity 102(2). Some examples of a trigger to start the data transfer at 318 may include a pre-defined schedule for performing the data transfer; receipt of a notification that there is enough bandwidth or other resources for performing the data transfer; receipt of an indication that a threshold number of agreements are waiting for data transfers; receipt of an indication that a threshold number of digital data objects are waiting for transfer; combinations of the foregoing, or various other trigger conditions that will be apparent to those of skill in the art having the benefit of the disclosure herein. Furthermore, in some examples, the data transfer may be performed in a batch manner, so that some data content, such as data content corresponding to different agreements and/or different blockchains may be bundled into one chunk or may be otherwise batch transferred together concurrently.

At 320, the data transfer may be completed to the respective storage programs of entities that are participating in the agreement.

At 322, the storage program 124(2) associated with the second entity 102(2) may send a transfer completion notification to the management program 114(2) associated with the second entity 102(2). In some examples, the data structure of the transfer completion notification may be the same as or similar to the data structure of the transfer completion notification 902 discussed above with respect to FIG. 9.

At 324, the management program 114(2) associated with the second entity 102(2) may send an examination request to the examiner program 110(2) associated with the second entity 102(2). In some examples, the data structure of the examination request may be the same as or similar to the data structure of the examination request 1002 discussed above with respect to FIG. 10. Further, the management program 114(2) may wait to send the examination request, such as until one or more trigger conditions are met, such as there are a threshold number of on-chain agreement documents ready for examination for efficient batch processing, waiting for some external resources used during the examination to become available, waiting for the computing device that performs the examination to become idle, or the like.

At 326, in response to receiving the examination request, the examiner program 110(2) associated with the second entity 102(2) may send a get request to the storage program 124(2) associated with the second entity 102(2). In some examples, the data structure of the get request may be the same as or similar to the data structure of the get request 1102 discussed above with respect to FIG. 11.

At 328, the storage program 124(2) associated with the second entity 102(2) may send a get response to the examiner program 110(2) associated with the second entity 102(2). In some examples, the data structure of the get response may be the same as or similar to the data structure of the get response 1202 discussed above with respect to FIG. 12.

At 330, in response to receiving the get response, the examiner program 110(2) may perform examination in a manner discussed above with respect to FIG. 2, and, in some examples, the examiner program 110(2) may perform more in-depth examination and/or for a greater length of time and/or using substantially more external resources due to the asynchronous nature of the process 300 of FIG. 3. Following completion of the examination, the examiner program 110(2) associated with the second entity 102(2) may send an examination response to the management program 114(2) associated with the second entity 102(2). In some examples, the data structure of the examination response may be the same as or similar to the data structure of the examination response 1302 discussed above with respect to FIG. 13.

At 332, in response to receiving the examination response with an indication that agreement and associated data passed the examination, the management program 114(2) associated with the second entity 102(2) may send an agreement update request to the second blockchain node 116(2) associated with the second entity 102(2). The agreement request may include a request to update the intermediate agreement on the blockchain following successful examination of the agreement.

Figure 27:
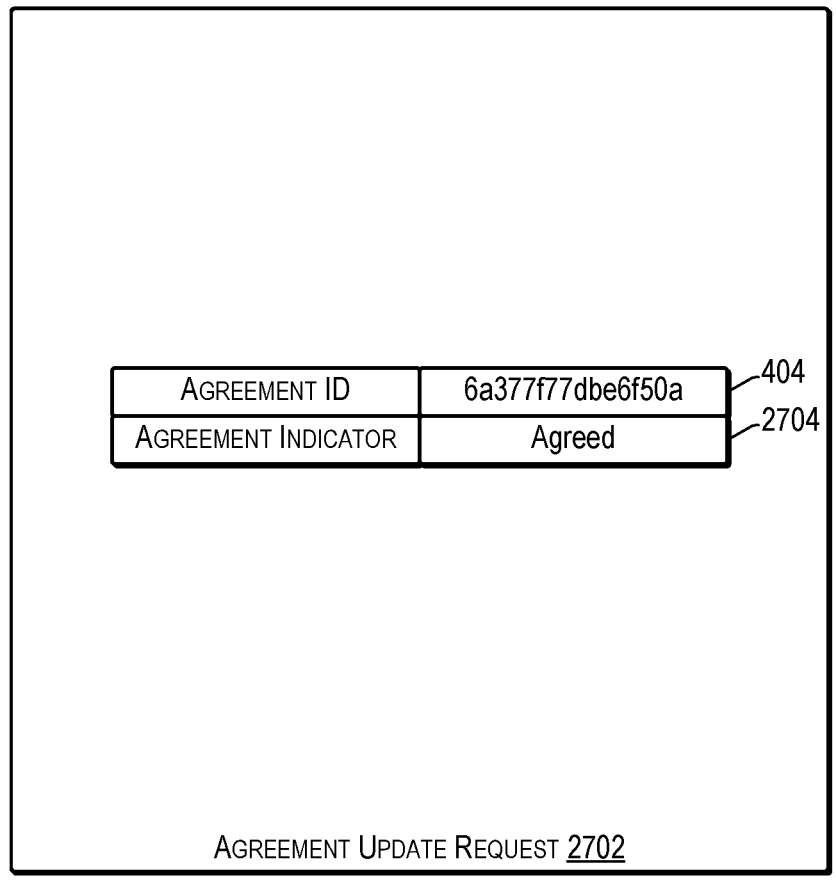
FIG. 27 illustrates an example data structure of an agreement update request according to some implementations.

FIG. 27 illustrates an example data structure of an agreement update request 2702 according to some implementations. In this example, the agreement update request 2702 includes the agreement ID 404, which identifies the current intermediate agreement that successfully passed examination. The agreement update request 2702 may further be accompanied by an agreement indicator 2704 indicating that the agreement has been agreed to by the second entity based on passing the examination.

Returning to FIG. 3, at 334, in response to receiving the agreement update request, the second blockchain node 116(2) associated with the second entity 102(2) may send an update proposal to the first blockchain node 116(1) associated with the first entity 102(1). For example, the update proposal may be sent to some or all of the other blockchain nodes in the blockchain network similar to the endorsement sent at 230 as discussed above with respect to FIGS. 2 and 15.

Figure 28:
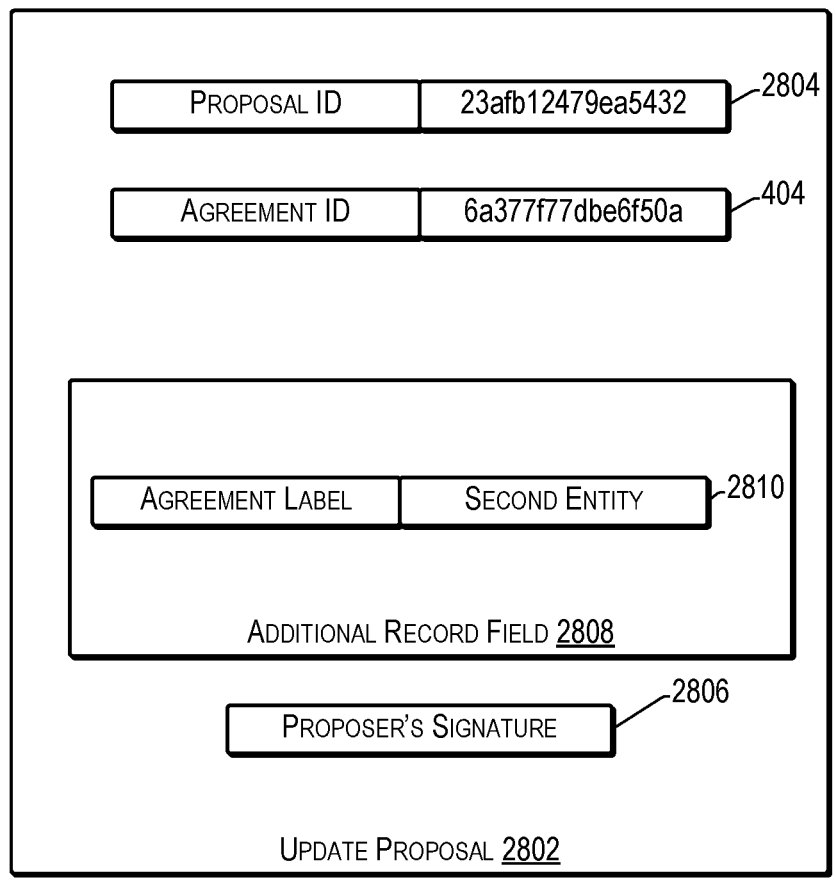
FIG. 28 illustrates an example data structure of an update proposal according to some implementations.

FIG. 28 illustrates an example data structure of an update proposal 2802 according to some implementations. In this example, the update proposal 2802 may include the agreement ID 404 to identify the agreement which is currently recorded on the blockchain as the intermediate agreement, and further includes a new proposal ID 2804 and a new proposer's signature 2806. Thus, in this situation, the second entity becomes the proposer and accordingly, a new proposal ID 2804 and a new proposer's signature 2806 are included. Similar to the proposer's signature mentioned above in connection with the proposal sent at 212, the proposer's signature 2806 may be a digital signature, such as an RSA signature or any other type of digital signature used by the blockchain network to indicate authorization from the second entity that the second entity agrees to the agreement. In addition, the update proposal 2802 include an additional record field 2808 that may be applied on the record of the agreement ID 404 on the blockchain. In this example, the additional record field 2808 includes an agreement label 2810, which indicates that the proposer (i.e., the second entity 102(2)) agrees with the agreement.

Returning to FIG. 3, at 336, in response to the sending of the agreement update request onto the blockchain network, at least at one blockchain node may verify that the entity in the agreement label 2810 matches the proposer's signature 2806 included in the agreement update request and may endorse the agreement update request. For example, the first blockchain node 116(1) associated with the first entity 102(1) may perform the verification of the digital signature, and may send an update endorsement to the second blockchain node 116(2) associated with the second entity 102(2) and to the other blockchain nodes in the blockchain network. For example, the update endorsement may be prepared and transmitted based on the protocols followed by the blockchain network in which the blockchain nodes 116(2) and 116(1) participate. In addition, the update endorsement may be sent to any other blockchain nodes in the blockchain network that may have received the update proposal sent at 334.

Figure 29:
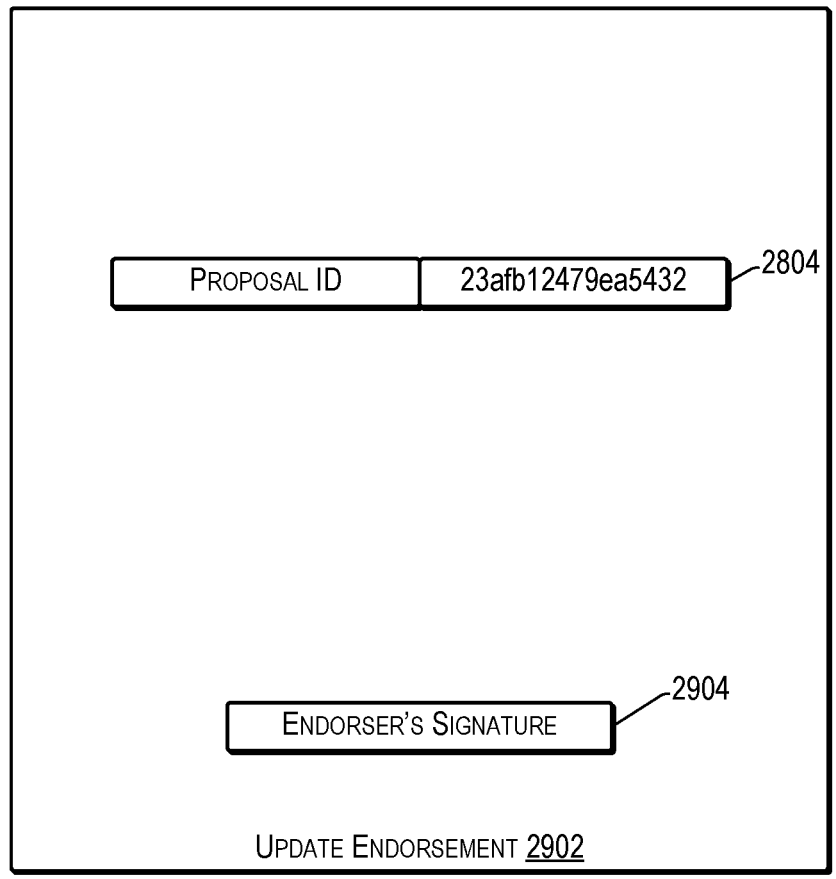
FIG. 29 illustrates an example data structure of an update endorsement according to some implementations.

FIG. 29 illustrates an example data structure of an update endorsement 2902 according to some implementations. In this example, the update endorsement 2902 includes the proposal ID 2804 received in the update proposal received from the second entity at 334. The update endorsement 2902 may further include an endorser's signature 2904. Similar to the proposer's signature mentioned above in connection with the proposal sent at 212, the endorser's signature may be a digital signature, such as an RSA signature or any other type of digital signature used by the blockchain network to indicate endorsement of the agreement.

Returning to FIG. 3, at 338, the second blockchain node 116(2) associated with the second entity 102(2) may send an update propagation to the first blockchain node 116(1) associated with the first entity 102(1). For example, in response to receiving the endorsement from the first entity and/or endorsements from any other entities participating in the blockchain network who may have received the update proposal at 334, the second blockchain node 116(2) associated with the second entity 102(2) may send an update propagation to the first blockchain node 116(1) associated with the first entity 102(1) and the other entities. For example, the second blockchain node 116(2) may verify the signature(s) of the endorser(s) and may record which blockchain node of which entity sent an update endorsement for the update proposal. The second blockchain node 116(2) may further determine whether a sufficient number of update endorsements have been received from the blockchain network. The number of update endorsements required may depend upon the particular agreement, but typically may include receiving an endorsement from all stakeholders involved in the agreement and from at least one supervisor of the agreement, if any. When the second blockchain node 116(2) has determined that the number of update endorsements received is greater than or equal to the required number of endorsements, the second blockchain node 116(2) may generate and send an update propagation to all blockchain nodes in the blockchain network, i.e., to each blockchain program 118 executing on a separate computing device in the blockchain network. Alternatively, in some examples, the second blockchain node 116(2) may not be required to send the update propagation directly to the other blockchain nodes as there may be one or more proxies in place to send the update propagation to the other blockchain nodes.

Figure 30:
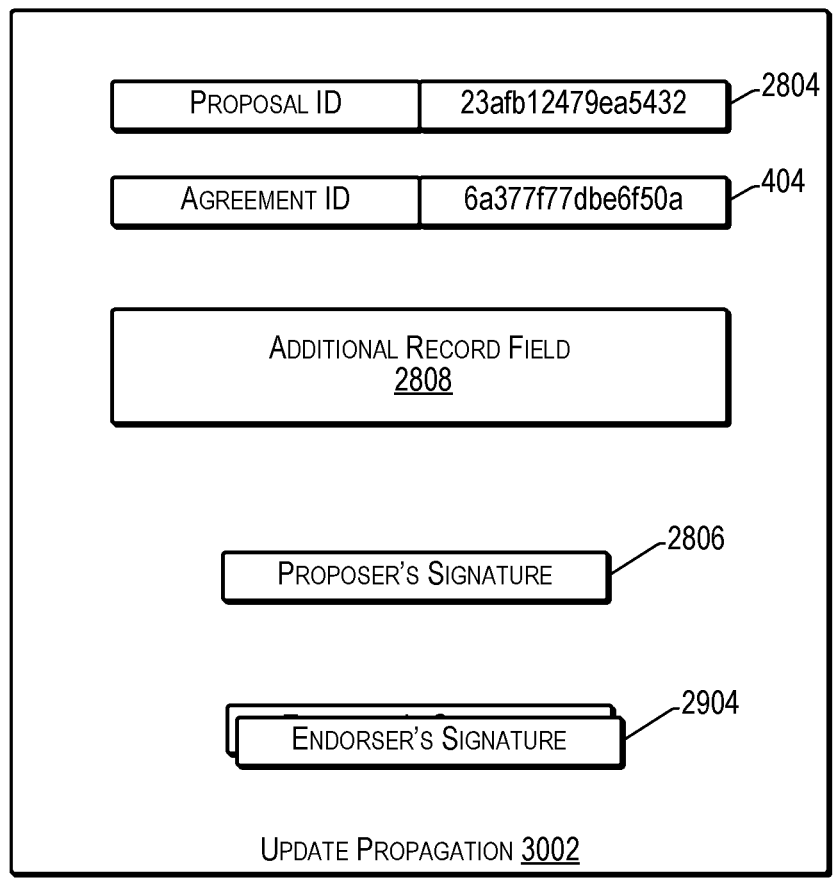
FIG. 30 illustrates an example data structure of an update propagation according to some implementations.

FIG. 30 illustrates an example data structure of an update propagation 3002 according to some implementations. In this example, the update propagation 3002 includes the proposal ID 2804 for the update proposal, the agreement ID 404 identifying the original agreement, the additional record field 2808 indicating the second entities approval of the agreement, the proposer's signature 2806 for the update proposal, and one or more endorser's signatures 2904.

Returning to FIG. 3, the first blockchain node 116(1) associated with the first entity 102(1) may receive the update propagation at 338, store a new block to its own blockchain, and, at 340, may send an update propagation acknowledgment to the second blockchain node 116(2) associated with the second entity 102(2). For example, upon receipt of the update propagation, the first blockchain node 116(1) may verify the proposer's signature, the endorser's signature(s), and may store the information in the update propagation to a new block on the blockchain managed by the respective blockchain node 116(1). Accordingly, each blockchain node participating in the blockchain network may add a new block to the blockchain managed by that blockchain node.

In addition, as mentioned above, at 340, the first blockchain node 116(1)) and any other blockchain nodes, (not shown in FIG. 3) that received the update propagation, may generate an update propagation acknowledgment and may send this to the second blockchain node 116(2) associated with the second entity 102(2). In some examples, the data structure of the update propagation acknowledgment may be similar to the agreement propagation acknowledgment 1702 described above with respect to FIG. 17.

At 342, in response to receiving the update propagation acknowledgement at 340, the second blockchain node 116(2) may send an agreement propagation notification to the second management program 114(2) to provide an assurance that the agreement update request 332 was successfully processed. The agreement propagation notification at 342 may have a data structure similar to that of the agreement propagation notification 1802 discussed above with respect to FIG. 18.

Figure 31:
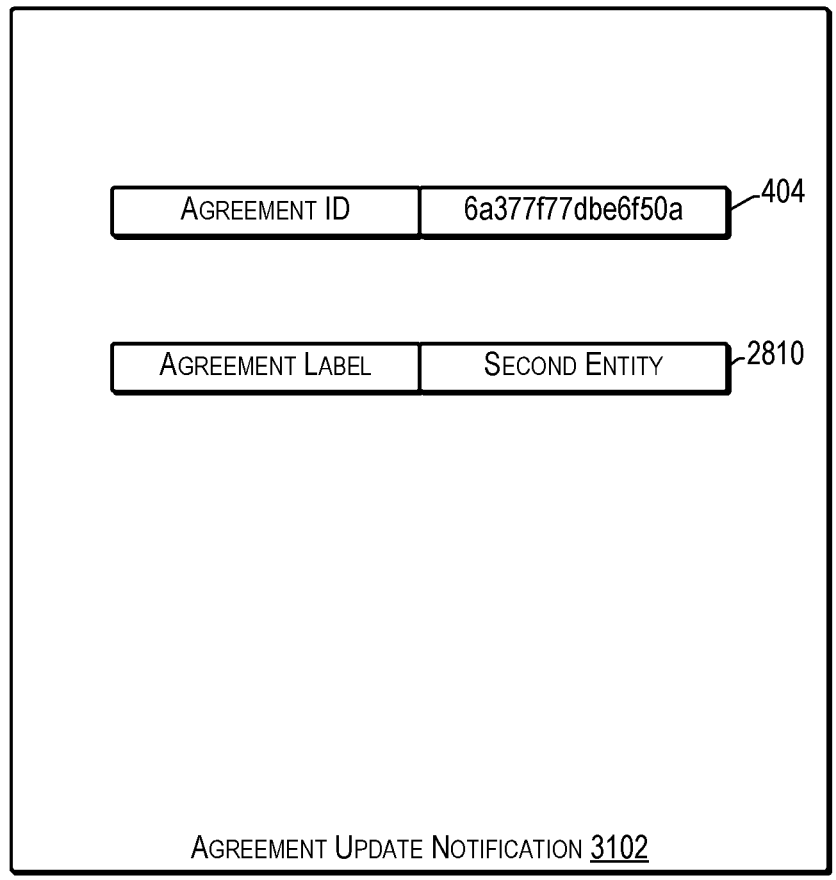
FIG. 31 illustrates an example data structure of an agreement update notification according to some implementations.

In addition, at 344, the first blockchain node 116(1) associated with the first entity 102(1) may send an agreement update notification to the management program 114(1) associated with the first entity 102(1). FIG. 31 illustrates an example data structure of an agreement update notification 3102 according to some implementations. In this example, the agreement update notification 3102 includes the agreement ID 404 and the agreement label 2810, which shows which entity has agreed to the identified agreement.

Returning to FIG. 3, at 346, in response to the agreement update notification, the management program 114(1) associated with the first entity 102(1) may send an agreement update status notification to the user application 106(1) associated with the first entity 102(1). For example, the agreement update status notification may indicate a list of entities that have agreed to the agreement and may further indicate whether all stakeholders of the agreement have agreed to the agreement.

Figure 32:
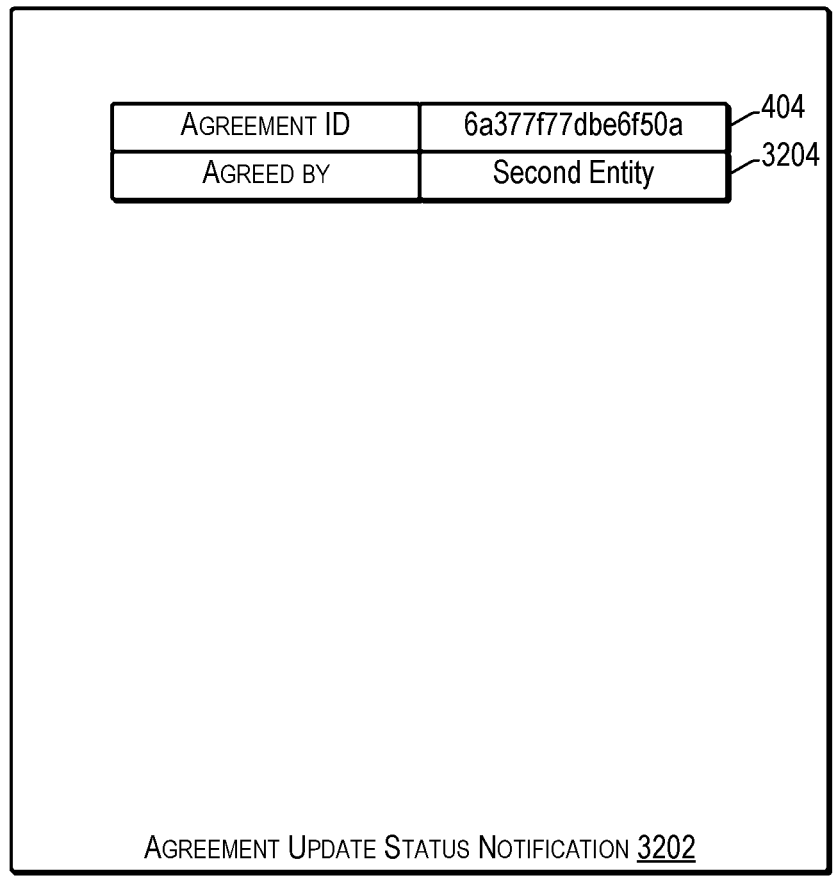
FIG. 32 illustrates an example data structure of an agreement status notification according to some implementations.

FIG. 32 illustrates an example data structure of an agreement update status notification 3202 according to some implementations. In this example, the agreement update status notification 3202 includes the agreement ID 404 and a listing 3204 of entities that have agreed to the agreement.

Figure 33:
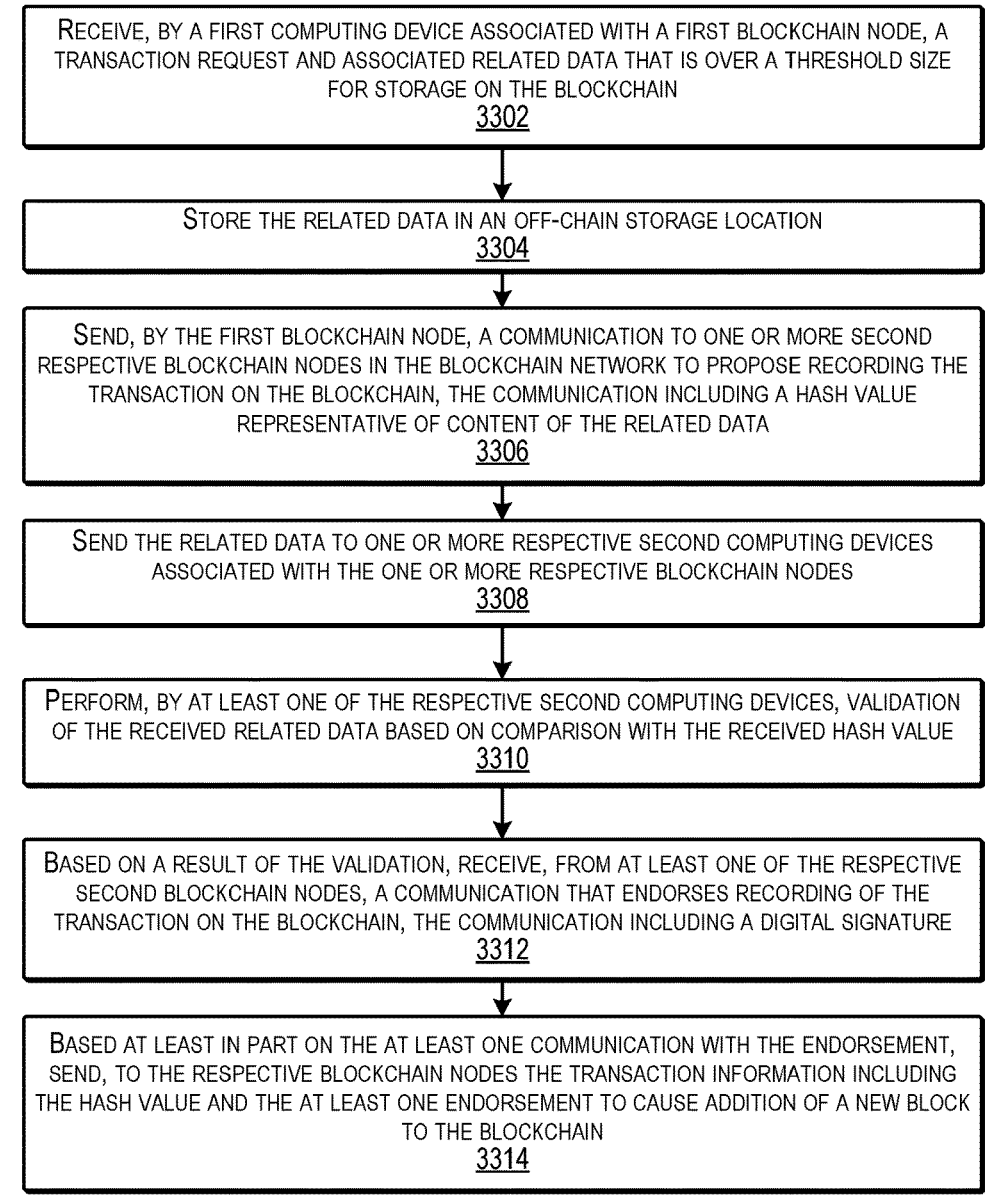
FIG. 33 is a flow diagram illustrating an example process for recording a transaction having related data stored off-chain according to some implementations.
Figure 34:
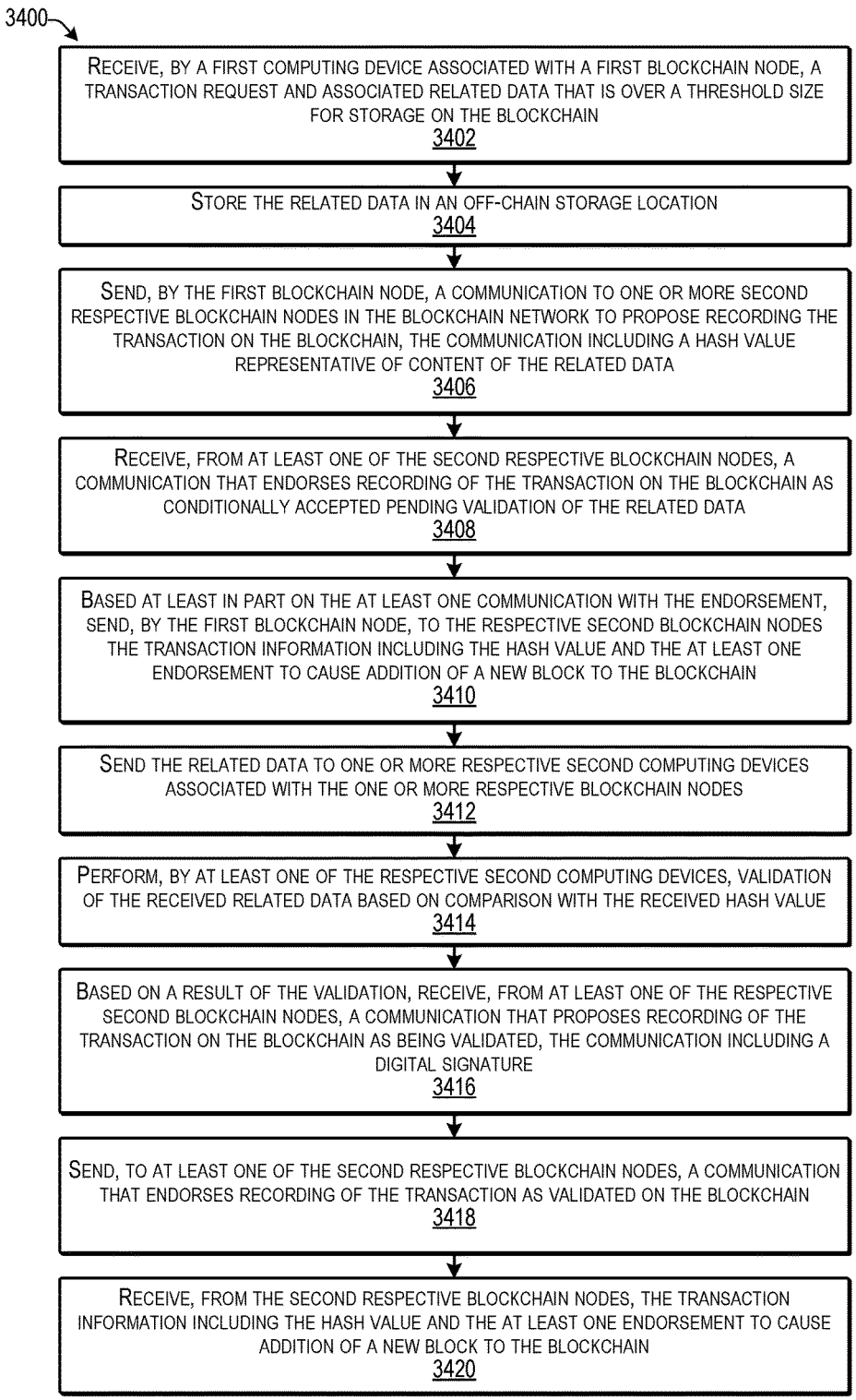
FIG. 34 is a flow diagram illustrating an example process for recording a transaction having related data stored off-chain according to some implementations.

FIGS. 33-34 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 33 is a flow diagram illustrating example processes 3300 for recording a transaction having related data stored off-chain according to some implementations. The processes 3300 may be performed by one of computing devices of an entity, or other suitable computing device(s).

At 3302, a first computing device associated with a first blockchain node may receive a transaction request and associated related data that is over a threshold size for storage on the blockchain. In addition, in some examples, upon receipt of the transaction request and the associated related data, the first computing device may compare a size of the associated related data with a threshold data size specified for storage on the blockchain and may designate the associated related data for off-chain storage based on the size of the associated related data exceeding the threshold size.

At 3304, the first computing device may store the related data in an off-chain storage location.

At 3306, the first blockchain node may send a communication to one or more respective second blockchain nodes in the blockchain network to propose recording the transaction on the blockchain, the communication including a hash value representative of content of the related data.

At 3308, the first computing device may send the related data to one or more respective second computing devices associated with the one or more respective blockchain nodes.

At 3310, at least one of the respective second computing devices may perform validation of the received related data based on comparison with the received hash value.

At 3312, based on a result of the validation, the first blockchain node may receive, from at least one of the respective second blockchain nodes, a communication that endorses recording of the transaction on the blockchain, the communication including a digital signature At 3314, based at least in part on the at least one communication with the endorsement, send, to the respective blockchain nodes the transaction information including the hash value and the at least one endorsement to cause addition of a new block to the blockchain.

FIG. 34 is a flow diagram illustrating an example process 3400 for recording a transaction having related data stored off-chain according to some implementations. In some examples, at least a portion of the process 3400 may be executed by the first computing device and the first blockchain node, or other suitable computing device(s).

At 3402, a first computing device associated with a first blockchain node may receive a transaction request and associated related data that is over a threshold size for storage on the blockchain. In addition, in some examples, upon receipt of the transaction request and the associated related data, the first computing device may compare a size of the associated related data with a threshold data size specified for storage on the blockchain and may designate the associated related data for off-chain storage based on the size of the associated related data exceeding the threshold size.

At 3404, the first computing device may store the related data in an off-chain storage location.

At 3406, the first blockchain node may send a communication to one or more respective second blockchain nodes in the blockchain network to propose recording the transaction on the blockchain, the communication including a hash value representative of content of the related data.

At 3408, the first blockchain node may receive, from at least one of the respective second blockchain nodes, a communication that endorses recording of the transaction on the blockchain nodes as conditionally accepted pending verification of the related data.

At 3410, based at least in part on the at least one communication with the endorsement, the first blockchain node may send, to the respective second blockchain nodes, the transaction information including the hash value and the at least one endorsement to cause addition of a new block to the blockchain. For example, the transaction may be recorded on the blockchain as being an intermediate or otherwise conditional transaction that is not fully agreed to until validation of the transaction information and the off-chain related data has been performed.

At 3412, the first computing device may send the related data to one or more respective second computing devices associated with the one or more respective blockchain nodes.

At 3414, at least one of the respective second computing devices may perform validation of the received related data based on comparison with the received hash value.

At 3416, based on a result of the validation, the first blockchain node may receive, from at least one of the respective second blockchain nodes, a communication that proposes recording of the transaction on the blockchain as being validated, the communication including a digital signature.

At 3418, the first blockchain node may send, to at least one of the respective second blockchain nodes, a communication that endorses recording of the transaction as validated on the blockchain.

At 3420, the first blockchain node may receive, from the respective second blockchain nodes, the transaction information including the hash value and the at least one endorsement to cause addition of a new block to the blockchain.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 35:
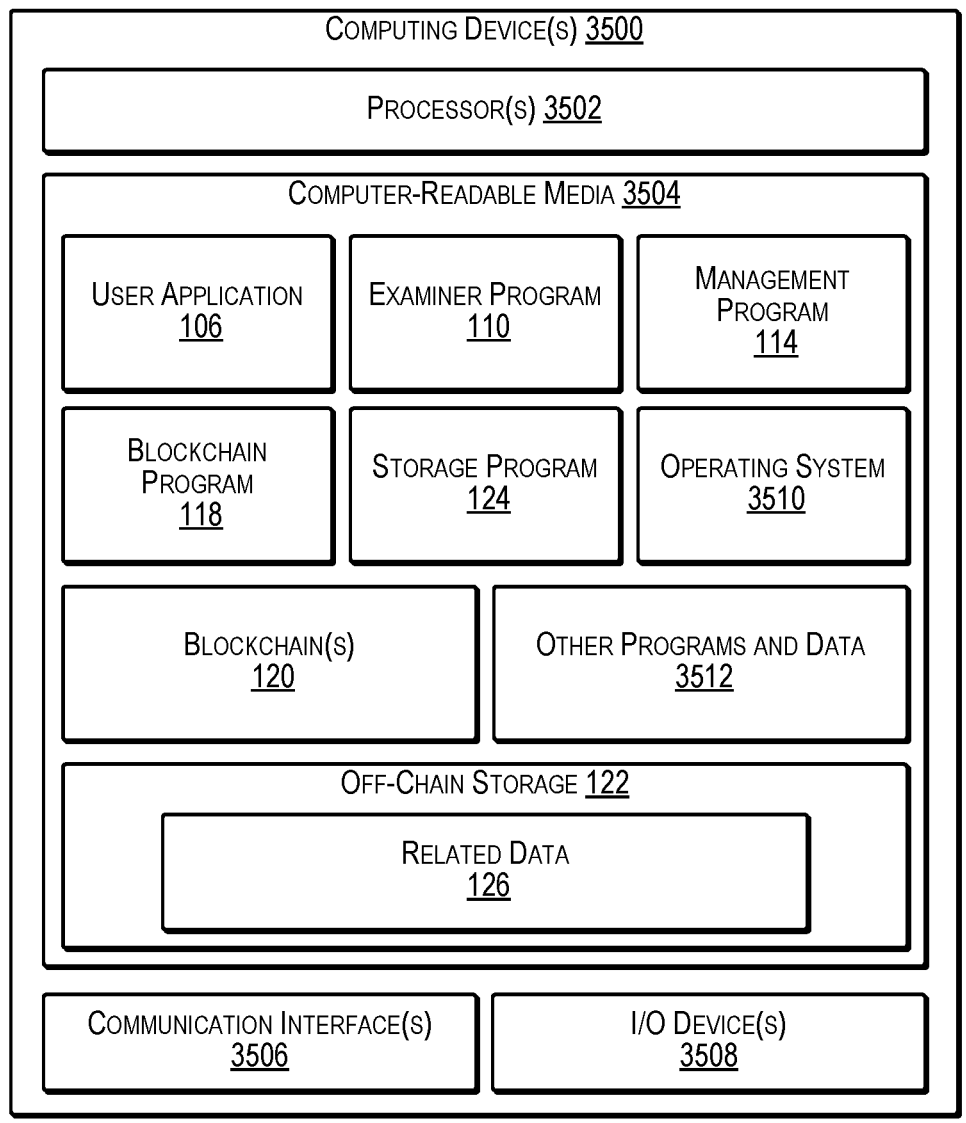
FIG. 35 illustrates an example architecture of computing device according to some implementations.

FIG. 35 illustrates select components of one or more example computing devices 3500 that may be used to implement some functionality of the services described herein, such as corresponding to the user computing device 104, the examiner computing device 108, the management computing device 112 and/or the blockchain node 116, as well as other computing devices mentioned in some alternative examples herein. The computing device(s) 3500 may include one or more servers or other types of computing devices that may be embodied in any number of ways. For instance, in the case of a server, the programs, other functional components, and data may be implemented on a single server, a cluster of servers, a server farm or data center, a cloud-hosted computing device, a virtual machine hosting computing device, and so forth, although other computer architectures may additionally or alternatively be used.

Further, while the figures illustrate the functional components and data of the computing device(s) 3500 as being present in a single location, these components and data may alternatively be distributed across different computing devices and different locations in any manner Consequently, the functions may be implemented by one or more computing devices 3500, with the various functionality described above distributed in various ways across the different computing devices. Multiple computing devices 3500 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each computing device 3500 may include one or more processors 3502, one or more computer-readable media 3504, one or more communication interfaces 3506, and one or more input/output (I/O) devices 3508. Each processor 3502 may be a single processing unit or a number of processing units, and may include single or multiple computing units or multiple processing cores. The processor(s) 3502 can be implemented as one or more microprocessors, microcomputers, microcontrollers, digital signal processors, central processing units, state machines, logic circuitries, and/or any devices that manipulate signals based on operational instructions. For instance, the processor(s) 3502 may be one or more hardware processors and/or logic circuits of any suitable type specifically programmed or configured to execute the algorithms and processes described herein. The processor(s) 3502 can be configured to fetch and execute computer-readable instructions stored in the computer-readable media 3504, which can program the processor(s) 3502 to perform the functions described herein.

The computer-readable media 3504 may include volatile and nonvolatile memory and/or removable and non-removable media implemented in any type of technology for storage of information, such as computer-readable instructions, data structures, program modules, or other data. Such computer-readable media 3504 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device 3500, the computer-readable media 3504 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 3504 may be used to store any number of functional components that are executable by the processors 3502. In many implementations, these functional components comprise instructions or programs that are executable by the processors 3502 and that, when executed, specifically configure the one or more processors 3502 to perform the actions attributed above to the computing device 3500. Functional components stored in the computer-readable media 3504 may include the user application 106, the examiner program 110, the management program 114, the blockchain program 118, and the storage program 124. Additional functional components stored in the computer-readable media 3504 may include an operating system 3510 for controlling and managing various functions of the computing device 3500.

In addition, the computer-readable media 3504 may store data used for performing the operations described herein. Thus, the computer-readable media 3504 may store the blockchain(s) 120. Further, the computer-readable media may include the off-chain storage 122 for storing the related data 126 in an off-chain location. In addition, the computer-readable media 3504 may store or otherwise maintain other functional components and data not specifically shown in FIG. 35, such as other programs and data 3512, which may include programs, drivers, etc., and the data used or generated by the functional components. Further, the computing device 3500 may include many other logical, programmatic, and physical components, of which those described above are merely examples that are related to the discussion herein.

The communication interface(s) 3506 may include one or more interfaces and hardware components for enabling communication with various other devices, such as over the network(s) 130. For example, communication interface(s) 3506 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The computing device 3500 may further be equipped with various input/output (I/O) devices 3508. Such I/O devices 3508 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
a first computing device associated with a first blockchain node able to communicate with one or more second computing devices associated with one or more respective second blockchain nodes, wherein the first computing device includes one or more processors configured by executable instructions to perform operations comprising:
receiving, by the first computing device, a transaction request for a transaction and related data associated with the transaction;
storing the related data in an off-chain storage location;
sending, by the first blockchain node, a communication to the one or more respective second blockchain nodes to propose recording the transaction on the blockchain, the communication including a hash value representative of content of the related data;
receiving, by the first blockchain node, from at least one of the respective second blockchain nodes, a communication that endorses recording of the transaction on the blockchain as conditionally accepted pending validation of the related data;
sending, by the first blockchain node, to the respective second blockchain nodes, the transaction information including the hash value and at least one first endorsement to cause addition of a new block to the blockchain;
sending, by the first computing device, the related data to the one or more second computing devices associated with the one or more respective second blockchain nodes;
receiving, by the first blockchain node, from at least one of the respective second blockchain nodes, a communication that proposes recording of the transaction on the blockchain as being validated;
sending, by the first blockchain node, to at least one of the respective second blockchain nodes, a communication that endorses recording of the transaction as validated on the blockchain; and receiving, by the first blockchain node, from at least one of the respective second blockchain nodes, the transaction information including the hash value and at least one second endorsement to cause addition of another new block to the blockchain.

2. The system as recited in claim 1, wherein sending, by the first blockchain node, the communication to the one or more respective second blockchain nodes to propose recording the transaction on the blockchain includes sending the transaction information and a digital signature associated with the first blockchain node.

3. The system as recited in claim 2, wherein receiving, by the first blockchain node, from at least one of the respective second blockchain nodes, the communication that proposes recording of the transaction on the blockchain as being validated indicates that at least one of the respective second blockchain nodes examined the transaction information and the related data to determine validity of the transaction information and the related data.

4. The system as recited in claim 3, wherein examining the transaction information and the related data includes comparing the hash value received from the first blockchain node with a hash value calculated from the related data.

5. The system as recited in claim 3, wherein examining the transaction information and the related data includes examining the transaction information and the related data to ensure that the related data supports the transaction described in the transaction information.

6. The system as recited in claim 1, the operations further comprising:
comparing a size of the related data with a threshold size for storage on the blockchain; and
designating the related data for off-chain storage based on the size of the related data exceeding the threshold size.

7. The system as recited in claim 1, wherein sending the related data to the one or more respective second computing devices is performed by batching the related data with related data for at least one other transaction, wherein the sending is triggered based on at least one condition being met, the at least one condition comprising at least one of:
an indication of a timing for data transfer based on a pre-defined schedule for performing the data transfer;
receipt of an indication that there is sufficient bandwidth or other resources for performing the data transfer;
receipt of an indication that a threshold number of transactions are waiting for data transfers; or
receipt of an indication that a threshold number of data objects of the related data and the related data for the at least one other transaction are waiting for transfer.

8. The system as recited in claim 1, wherein the one or more processors of the first computing device execute a blockchain program to cause the first computing device to function as the first blockchain node.

9. A method comprising:
receiving, by a first computing device associated with a first blockchain node, a transaction request for a transaction and an indication of related data associated with the transaction for storage in an off-chain storage location;
sending, by the first blockchain node, a communication to a second blockchain node to propose recording the transaction on the blockchain, the communication including a summary value representative of content of the related data;

receiving, by the first blockchain node, from the second blockchain node, a communication that endorses recording of the transaction on the blockchain as conditionally accepted pending validation of the related data;

sending, by the first blockchain node, to the second blockchain node, a communication to cause addition of a new block to the blockchain, the new block indicating the conditional acceptance of the transaction;

sending, by the first computing device, the related data to a second computing device associated with the second blockchain node;

receiving, by the first blockchain node, from the second blockchain node, a communication that proposes recording of the transaction on the blockchain as being validated;

sending, by the first blockchain node, to the second blockchain node, a communication that endorses recording of the transaction as validated on the blockchain; and receiving, by the first blockchain node, from the second blockchain node, a communication to cause addition of another new block to the blockchain indicating validity of the transaction.

10. The method as recited in claim 9, wherein sending, by the first computing device, the related data to the second computing device associated with the second blockchain node comprises batching the related data with related data for at least one other transaction.

11. The method as recited in claim 9, wherein sending, by the first computing device, the related data to the second computing device associated with the second blockchain node is triggered based on at least one condition being met, the at least one condition comprising at least one of:
an indication of a timing for data transfer based on a pre-defined schedule for performing the data transfer;
receipt of an indication that there is sufficient bandwidth or other resources for performing the data transfer;
receipt of an indication that a threshold number of transactions are waiting for data transfers; or
receipt of an indication that a threshold number of data objects of the related data are waiting for transfer.

12. The method as recited in claim 9, wherein receiving, by the first blockchain node, from the second blockchain node, the communication that proposes recording of the transaction on the blockchain as being validated indicates that the second computing device associated with the second blockchain node examined transaction information about the transaction and the related data to determine validity of the transaction information and the related data.

13. The method as recited in claim 9, wherein, receiving the related data causes, at least in part, the second computing device to examine transaction information about the transaction and the related data by comparing the summary value received from the first blockchain node with a summary value calculated from content of the received related data.

14. The method as recited in claim 9, wherein sending, by the first blockchain node, the communication to the second blockchain node to propose recording the transaction on the blockchain includes sending transaction information about the transaction and a digital signature associated with the first blockchain node.

15. The method as recited in claim 9, wherein the summary value is calculated at least from content of the related data using a hash algorithm.

16. A method comprising:
- receiving, by a first computing device associated with a first blockchain node, a transaction request for a transaction and an indication of related data associated with the transaction for storage in an off-chain storage location;
- sending, by the first blockchain node, a communication to a second blockchain node to propose recording the transaction on the blockchain, the communication including a summary value representative of content of the related data;
- sending, by the first computing device, the related data to a second computing device associated with the second blockchain node;
- receiving, by the first blockchain node, from the second blockchain node, a communication that endorses recording of the transaction on the blockchain as accepted based on validation of the related data; and
- sending, by the first blockchain node, to the second blockchain node, a communication to cause addition of a new block to the blockchain, the new block indicating the acceptance of the transaction.

17. The method as recited in claim 16, wherein receiving, by the first blockchain node, from the second blockchain node, the communication that endorses recording of the transaction on the blockchain as accepted based on validation of the related data indicates that the second blockchain node examined transaction information about the transaction and the related data to determine validity of the transaction information and the related data.

18. The method as recited in claim 17, wherein examining the transaction information and the related data includes comparing the summary value received from the first blockchain node with a summary value calculated from the related data.

19. The method as recited in claim 16, wherein sending, by the first blockchain node, the communication to the second blockchain node to propose recording the transaction on the blockchain includes sending transaction information about the transaction and a digital signature associated with the first blockchain node.

20. The method as recited in claim 16, further comprising:
- comparing a size of the related data with a threshold size for storage on the blockchain; and
- designating the related data for off-chain storage based on the size of the related data exceeding the threshold size.

* * * * *